United States Patent
Roper et al.

(10) Patent No.: US 10,501,202 B2
(45) Date of Patent: Dec. 10, 2019

(54) IGNITION-QUENCHING SYSTEMS, APPARATUSES, AND METHODS

(71) Applicant: The Boeing Company, Chicago, IL (US)

(72) Inventors: Christopher S. Roper, Oak Park, CA (US); John Rubrecht Lowell, Fairfax, VA (US); Eddie Kwon, Seattle, WA (US); Jason Scott Damazo, Seattle, WA (US); Eric C. Clough, Woodland Hills, CA (US); Zak C. Eckel, Newbury Park, CA (US); Sloan Patrick Smith, Moorpark, CA (US); Randall Schubert, Santa Monica, CA (US); Geoffrey P. McKnight, Los Angeles, CA (US); Jacob J. Mikulsky, Santa Monica, CA (US); Sophia Shu Yang, Seattle, WA (US); Joanna Kolodziejska, Arcadia, CA (US); Michael Scott Cameron, Long Beach, CA (US); Blaine Knight Rawdon, San Pedro, CA (US); Darrin M. Hansen, Seattle, WA (US)

(73) Assignee: The Boeing Company, Chicago, IL (US)

(*) Notice: Subject to any disclaimer, the term of this patent is extended or adjusted under 35 U.S.C. 154(b) by 149 days.

(21) Appl. No.: 15/684,738

(22) Filed: Aug. 23, 2017

(65) Prior Publication Data
US 2019/0061975 A1    Feb. 28, 2019

(51) Int. Cl.
*F16B 37/14*    (2006.01)
*B64D 45/02*    (2006.01)
(Continued)

(52) U.S. Cl.
CPC .............. *B64D 45/02* (2013.01); *F16B 37/14* (2013.01); *B64D 37/32* (2013.01); *F16B 33/004* (2013.01); *F16J 15/14* (2013.01)

(58) Field of Classification Search
CPC ................................ F16B 37/14; B64D 45/02
(Continued)

(56) References Cited

U.S. PATENT DOCUMENTS 1,673,486 A * 6/1928 Berge ........................ A47G 3/00
292/307 R
3,485,134 A * 12/1969 Ott .......................... F16B 37/14
411/372

(Continued)

FOREIGN PATENT DOCUMENTS

EP    3120900    1/2017

OTHER PUBLICATIONS

"Customized Sealant Solutions: PRC® Seal Caps," PPG Aerospace, product literature downloaded from ppgaerospace.com on Sep. 7, 2016.

(Continued)

*Primary Examiner* — Flemming Saether
(74) *Attorney, Agent, or Firm* — Dascenzo Intellectual Property Law, P.C.

(57) ABSTRACT

Ignition-quenching systems comprise an ignition-quenching cover configured to quench an ignition event in a combustible environment triggered by an ignition source associated with a fastener stack. The ignition-quenching cover comprises a porous body that is gas permeable and that has pores sized to quench ignition in the combustible environment. The ignition-quenching cover further comprises a cover attachment feature configured to mate with a fastener attachment feature of the fastener stack. The ignition-quenching cover is configured to cover the fastener stack, which may (Continued)

be associated with a potential ignition source that produces an ignition event in the combustible environment. The porous body may include one or more porous elements that may be formed of various polymeric, mesh, or fabric materials. The ignition-quenching cover may comprise a non-porous frame that is bonded to the porous body and that defines the cover attachment feature.

20 Claims, 9 Drawing Sheets

(51) Int. Cl.
  *B64D 37/32* (2006.01)
  *F16B 33/00* (2006.01)
  *F16J 15/14* (2006.01)

(58) Field of Classification Search
  USPC .................................. 411/372.5, 372.6, 373
  See application file for complete search history.

(56) References Cited

U.S. PATENT DOCUMENTS

| | | | |
|---|---|---|---|
| 3,699,368 A | | 10/1972 | Palmer |
| 3,969,786 A | * | 7/1976 | Peak ............... E05F 5/06 16/86 A |
| 4,013,190 A | | 3/1977 | Wiggins et al. |
| 4,129,060 A | * | 12/1978 | Gould .............. A47G 3/00 411/372.5 |
| 4,519,974 A | | 5/1985 | Bravenec et al. |
| 4,636,446 A | | 1/1987 | Lee |
| 4,820,097 A | * | 4/1989 | Maeda ............. F02K 1/80 165/134.1 |
| 4,826,380 A | | 5/1989 | Henry |
| 4,923,348 A | * | 5/1990 | Carlozzo ......... F16B 33/004 411/377 |
| 5,108,853 A | | 4/1992 | Feres |
| 6,102,128 A | | 8/2000 | Bridgeman |
| 7,134,666 B2 | | 11/2006 | Beyssac et al. |
| 7,584,582 B1 | * | 9/2009 | Hutter, III ....... B64C 1/40 156/91 |
| 7,878,747 B2 | * | 2/2011 | Dean ............... A47G 3/00 411/372.5 |
| 7,918,081 B2 | | 4/2011 | Schlichting et al. |
| 8,717,735 B2 | | 5/2014 | Day et al. |
| 8,717,736 B2 | | 5/2014 | Asahara et al. |
| 8,840,740 B2 | | 9/2014 | Rorabaugh et al. |
| 8,894,338 B2 | | 11/2014 | Dobbin et al. |
| 9,188,226 B2 | | 11/2015 | Pajel et al. |
| 9,951,804 B2 | * | 4/2018 | Dobbin ............ F16B 37/14 |
| 2008/0137259 A1 | | 6/2008 | Heeter et al. |
| 2009/0194297 A1 | | 8/2009 | Ortiz Teruel |
| 2013/0206759 A1 | | 8/2013 | Wuertz et al. |
| 2015/0060465 A1 | | 3/2015 | Limbacher et al. |
| 2015/0082603 A1 | | 3/2015 | Rawdon et al. |
| 2015/0086295 A1 | | 3/2015 | Cameron et al. |
| 2015/0182899 A1 | * | 7/2015 | Bansal ............ B01D 39/1661 55/521 |
| 2015/0184688 A1 | | 7/2015 | Dobbin et al. |
| 2017/0008636 A1 | | 1/2017 | Gaw |
| 2017/0021209 A1 | | 1/2017 | Damazo et al. |
| 2017/0108029 A1 | | 4/2017 | Song et al. |

OTHER PUBLICATIONS

"Porex® Battery Vents—Flame Arrestors," Porex Corporation, product literature downloaded from porex.com on Apr. 3, 2017.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.
European Patent Office, Extended European Search Report for related European Application No. 18185783, dated Jan. 17, 2019.

* cited by examiner

IGNITION-QUENCHING SYSTEMS, APPARATUSES, AND METHODS

FIELD

The present disclosure relates to systems, apparatuses, and methods for quenching ignition.

BACKGROUND

In many situations, devices must operate in potentially hazardous conditions, such as where a fuel mixture may be ignited by uncontrolled operating or environmental conditions. For example, vehicles, including aerospace vehicles, typically operate with a fuel that must be maintained in a safe condition during storage and use. The ignition hazard should be minimized even when the vehicle is subject to uncontrolled events such as an accident, electrical malfunction, a lightning strike, or static electrical discharge. Other applications requiring ignition hazard consideration include fuel transport, fuel storage, mining operations, chemical processing, metal fabrication, power plant construction and operation, and operations which involve combustible particulate such as sawdust, metal, flour, and grain.

In the aerospace industry, lightning strikes of aircraft are a concern because they could result in electrical arcs and/or heating sufficient to ignite vaporous fuel mixtures. Though lightning passes through aircraft virtually always without resulting harm, newer aircraft designs incorporating composite materials include less metal and conductors to shunt and/or dissipate the energy of a lightning strike.

During a lightning strike on an aircraft, a high electrical current may propagate through conductive paths on the aircraft. Due to the non-isotropic electrical conduction of composite materials used in certain aircraft designs and potentially poor electrical connection at panel interfaces, the electrical current may pass through a fastener stack when propagating from one composite panel to another. While passing through a fastener stack, the current may generate electromagnetic effects, such as electrical arcs, hot gas, and/or hot particles, that may interact with combustible fuel vapor (in the absence of safety measures). Such an uncontained emission of energy may pose an ignition risk to aircraft fuel tanks. In a typical commercial aircraft, hundreds to thousands of fastener stacks may extend into the fuel tank, and every one needs to not pose an ignition risk in the event of a lightning strike.

As a safety measure, the exposed ends on fastener stacks may be covered with polysulfide cap seals to seal fuel mixtures in a fuel tank from any arcs, hot gas, or hot particles that may form as a result of a lightning strike. However, these caps require an airtight seal to be effective. Without an airtight seal, fuel may contact the fastener stack and/or the arc, hot gas, or hot particles may bypass the unsealed cap to present an ignition risk. Additionally, environmental exposure (e.g., thermal cycling) and/or electromagnetic effects at the fastener stack may damage the seal. Achieving a resilient, airtight seal is a labor-intensive process that may need to be repeated thousands of times per aircraft. The associated installation time as well as inspection time increase the cost and production time of aircraft.

SUMMARY

Ignition-quenching systems comprise an ignition-quenching cover configured to quench an ignition event in a combustible environment triggered by an ignition source associated with a fastener stack. The ignition-quenching cover comprises a porous body that is gas permeable and that has pores sized to quench ignition in the combustible environment. The ignition-quenching cover further comprises one or more cover attachment features configured to mate with one or more fastener attachment features of the fastener stack. The ignition-quenching cover is configured to cover the fastener stack, which may be associated with a potential ignition source that produces an ignition event in the combustible environment. The porous body may include one or more porous elements that may be formed of various polymeric, mesh, or fabric materials. The ignition-quenching cover may comprise a non-porous frame that is bonded to the porous body and that defines the cover attachment feature(s). The cover attachment features and the fastener attachment features may be configured to snap together, thread together, and/or mechanically interlock.

DESCRIPTION

Figure 1:
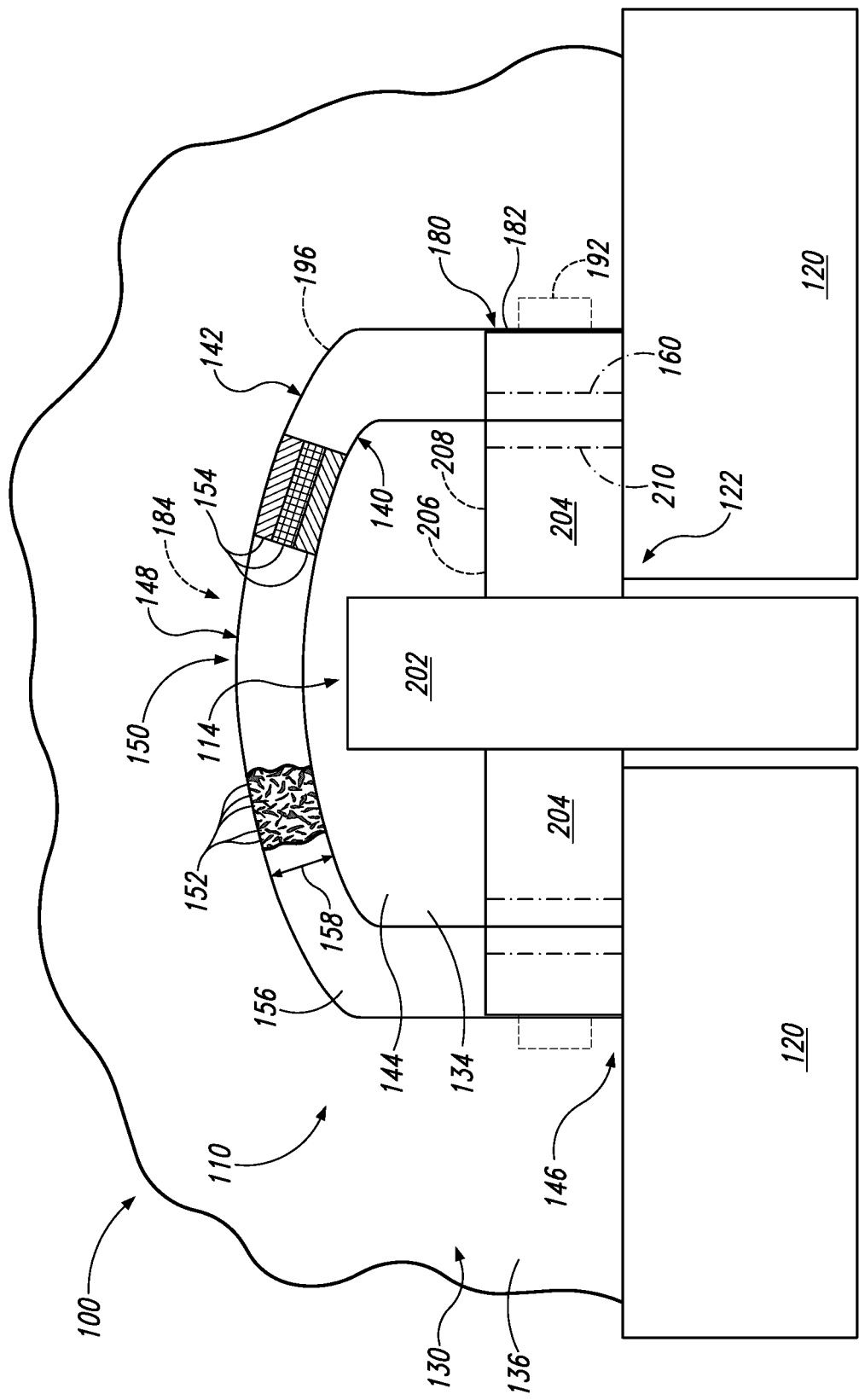
FIG. 1 is schematic representation of an ignition-quenching system.

Unlike conventional cap seals, ignition-quenching covers of the present disclosure do not attempt to seal in all of the kinetic and thermal energy of electromagnetic effects at fastener stacks (as might be generated by a lightning strike). Instead, ignition-quenching covers of the present disclosure permit gas, liquid, and/or some (non-ballistic) particles to flow through the cover while removing the thermal and/or kinetic energy that may ignite a combustible environment such as a fuel mixture in a fuel tank. Hence, ignition sources, ignition events, and/or combustion within the ignition-quenching covers of the present disclosure do not propagate outside of the ignition-quenching covers. Additionally, because there is no need for a gas-tight seal, installation of ignition-quenching covers according to the present disclosure may be greatly simplified relative to conventional cap seals. Further, the porous structures on the disclosed ignition-quenching covers may save weight and add useable fuel volume relative to conventional cap seals.

FIGS. 1-18 provide examples of systems and components for quenching ignition. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic representation of an ignition-quenching system 100 that includes an ignition-quenching cover 110. The ignition-quenching cover 110 (also called an ignition arrestor cover) covers a fastener stack 114 that extends and/or protrudes from a support structure 120 at a fastener site 122. When assembled in the ignition-quenching system 100, the ignition-quenching cover 110 and the fastener stack 114 are co-located at the fastener site 122, with the ignition-quenching cover 110 covering and/or enclosing the fastener stack 114. The ignition-quenching cover 110 and the fastener stack 114 generally are (but need not be) substantially rotationally symmetric about an axis of the fastener stack 114 and perpendicular to the local plane of the support structure 120. Hence, the schematic view of FIG. 1 represents a cross sectional view of the ignition-quenching system 100.

The fastener stack 114 is a structure that includes a fastener 202 such as a bolt, stud, pin, rivet, etc. that couples to the support structure 120. The fastener stack 114 may include one or more coupling elements 204 such as a nut 206, a washer 208, a bushing, etc. The fastener stack 114 includes metal and/or conductive components that could shunt electrical current and/or be associated with electromagnetic effects that may become ignition sources. For example, the fastener 202 may be subject to electromagnetic effects that may produce arcing at the fastener 202 and/or the coupling element(s) 204.

The ignition-quenching systems 100 may include a combustible environment 130. Additionally or alternatively, ignition-quenching system 100, and/or components thereof, may be configured for contact and/or utilization with the combustible environment 130 (e.g., chemically resistant to and/or chemically nonreactive with combustible environment 130). Combustible environment 130 is combustible and includes a combustible substance and/or mixture. For example, combustible environment 130 may include a fuel (e.g., hydrogen, gaseous, liquid, and/or aerosolized hydrocarbon, and/or suspended particulate such as sawdust, etc.), an oxidizer (e.g., oxygen, fluorine, and/or nitrous oxide), and optionally a non-reactive diluent (e.g., nitrogen, argon, and/or helium) with concentrations within the flammability limits of the fuel/oxidizer mixture. As another example, combustible environment 130 may include a gas that undergoes explosive decomposition (e.g., acetylene, nitrous oxide). Additional specific examples of fuels include motor fuels such as automotive fuel, diesel fuel, aviation fuel, and/or jet fuel. Combustible environment 130 may include gases, vapors, aerosols, and/or particulate.

The ignition-quenching cover 110 has an interior surface 140 and an exterior surface 142. The interior surface 140 is configured to face the fastener stack 114 and/or the support structure 120. The interior surface 140 may be referred to as the proximal cover side and/or the inside surface of the ignition-quenching cover 110. The exterior surface 142 is opposite the interior surface 140, across a thickness 158 of the ignition-quenching cover 110. The exterior surface 142 is a boundary of an external volume 136 of the combustible environment 130. The exterior surface 142 is configured to face towards the external volume 136 and to face generally away from the fastener stack 114 and the support structure 120. Exterior surface 142 may be referred to as the distal cover side and/or the outer surface of the ignition-quenching cover 110. Further, the ignition-quenching cover 110 has a base 146 located in contact with or most proximate to the support structure 120. The ignition-quenching cover 110 also has a tip 148 located most distant from the support structure 120. The base 146 includes a portion of the interior surface 140. The tip 148 is a portion of the exterior surface 142.

The ignition-quenching cover 110 is porous, permitting the combustible environment 130 to permeate into and through the ignition-quenching cover 110 and to contact the fastener stack 114. Ignition-quenching cover 110 includes, and may be essentially composed of, a porous body 150 that is configured to permit the combustible environment 130 to permeate into and through the porous body 150. The external volume 136 of the combustible environment 130 is the portion of the combustible environment 130 not within the ignition-quenching cover 110 and not enclosed by the ignition-quenching cover 110 between the interior surface 140 and the fastener stack 114 and/or the support structure 120.

When the ignition-quenching cover 110 is installed over the fastener stack 114 on the support structure 120, the volume between the interior surface 140 and the fastener stack 114 (and which may be further defined by the support structure 120) is an enclosed volume 134 of the ignition-quenching cover 110. The ignition-quenching cover 110 generally has a cavity 144 defined by the interior surface 140 to establish the enclosed volume 134 around the fastener stack 114. The cavity 144 is configured, sized, and/or shaped to receive and/or to engage the fastener stack 114. The cavity 144 may be referred to as a recess, a concavity, a receptacle, and/or a socket. The enclosed volume 134 may be at least 0.001 cc (cubic centimeters), at least 0.01 cc, at least 0.1 cc, at least 1 cc, at most 100 cc, at most 50 cc, at most 20 cc, at most 10 cc, at most 4 cc, and/or at most 2 cc.

The volume within the ignition-quenching cover 110 (e.g., the volume between the interior surface 140 and the exterior surface 142) that is accessible to the combustible environment 130 may be referred to as an interior volume 156 (also called a pore volume) of the ignition-quenching cover 110. The enclosed volume 134 and the interior volume 156 are substantially less than the external volume 136 of the combustible environment 130. Hence, the external volume 136 of the combustible environment 130 may be referred to as the bulk of the combustible environment 130.

The ignition-quenching cover 110 is configured to prevent an ignition source originating from the fastener stack 114 (e.g., due to electromagnetic effects) from igniting the external volume 136 of the combustible environment 130. That is, an ignition source confined by the ignition-quenching cover 110 is prevented from producing substantial and/or undesirable combustion (e.g., explosive combustion) in the external volume 136 of the combustible environment 130. Examples of ignition sources include an electrical arc, a hot surface, a hot particle ejection, and/or an electrostatic discharge (e.g., due to internal friction and/or tribocharging).

Without the ignition-quenching cover 110, an ignition source within the combustible environment 130 would generate an ignition kernel (a small volume of combustion initiated by the energy imparted by the ignition source). Typically, but not necessarily, an ignition source would create a region of energetic gas that has high pressure and high temperature over a time scale during which the gas is essentially not moving (i.e., the energy deposition from the ignition source would be essentially impulsive). Due to this energy deposition, the energetic gas will expand into the surrounding gas that had been unaffected by the energy deposition. The sudden expansion of the energetic gas creates a pressure wave which may be acoustic or supersonic. If the pressure wave is sufficiently energetic, it may cause direct ignition of the combustion reactants (e.g., detonation).

The ignition-quenching cover 110 generally is configured to quench ignition from an ignition source that does not pose a direct ignition risk due to the associated pressure wave. For example, typical ignition sources to be mitigated by the ignition-quenching cover 110 impart less than 1 J (joules) or less than 0.1 J (and typically more than 1 µJ (microjoules) or more than 10 µJ). Such lower energy ignition sources may generate weak shock waves and/or pressure waves with a pressure amplitude less than about 100 kPa (kilopascals). Further, ignition-quenching cover 110 may be configured to withstand a pressure wave (if any) generated by an ignition source enclosed by the ignition-quenching cover 110, for example, by being porous enough to permit gas pressure equalization across the ignition-quenching cover 110. The ignition-quenching cover 110 may be configured to partially impede and/or dissipate the pressure wave and may be configured to permit the pressure wave to pass substantially unimpeded.

Without the ignition-quenching cover 110, the ignition kernel would generate hot gases and/or hot particles that are a direct ignition risk. These reaction products may drive a self-propagating combustion reaction (an established flame front, e.g., a deflagration wave or detonation wave) that would consume all of the available combustion reactants. Flame arrestors may be placed in the path of the established flame front to limit the propagation of the flame front. For example, flame arrestors may be placed in fuel fill tubes to prevent an established flame front from propagating through the fuel fill tube. Flame arrestors typically are installed in a transfer path, such as a fill tube, a pour spout, and/or conduit, and therefore are configured to permit flow of gas and liquid substantially unimpeded.

The ignition-quenching cover 110 is configured to prevent the formation of an ignition kernel due to an ignition source at the fastener stack 114 and/or to prevent propagation of a nascent flame front originating from the ignition kernel. That is, the ignition-quenching cover 110 may be configured to prevent ignition of the combustible environment 130 within the enclosed volume 134 and may be configured to quench and/or extinguish ignition within and/or in proximity to the ignition-quenching cover 110 (e.g., within the enclosed volume 134 and/or the interior volume 156). Thus, if an ignition source does ignite an ignition kernel within the enclosed volume 134, the nascent flame front generated by the ignition kernel does not pass through and/or around the ignition-quenching cover 110. The nascent flame front is quenched before the nascent flame front could contact the combustible environment 130 in the external volume 136 and establish a self-propagating flame front. Together, the ignition kernel, the associated nascent flame front, and the associated pressure wave within the enclosed volume 134 may be referred to as an ignition event. The ignition-quenching cover 110 is configured to prevent, mitigate, and/or suppress one or more aspects of an ignition event triggered (ignited) by an ignition source associated with the fastener stack 114.

Because the ignition-quenching cover 110 is configured to quench, extinguish, and/or suppress combustion (an ignition event) within and/or in proximity to the ignition-quenching cover 110, the ignition-quenching cover 110 does not need to quench an established flame front like a deflagration wave. By preventing further combustion when the combusted region is small, the requirements to withstand heat and/or pressure are likewise small, as compared to the requirements to stop an established flame front (as needed for a flame arrester). Similarly, the potential combusted volume of the combustible environment 130 is smaller if combustion is stopped at the source rather than at a distant location in the path of the established flame front.

The ignition-quenching cover 110 may be configured to prevent formation, propagation, and/or maturation of an ignition kernel therein by dissipating heat energy associated with the ignition source and/or the ignition kernel. An ignition kernel may mature into a self-propagating combustion reaction (e.g., a deflagration wave) when heat energy from the reaction sufficiently heats neighboring combustion reactants (i.e., when energy released is greater than energy losses). Ignition-quenching cover 110 may be configured to dissipate heat energy that may otherwise serve to sustain a combustion reaction. For example, the porous body 150 may have a surface area to pore volume ratio that is high enough to prevent combustion from propagating through the porous body 150 because of the thermal contact between the porous body 150 and the combustible environment 130 within the porous body 150.

The porous body 150 and/or ignition-quenching cover 110 may have a specific heat capacity that is greater, typically much greater, than the specific heat capacity of combustible environment 130. For example, the porous body 150, and/or components thereof, may have a volumetric specific heat capacity that is at least 10 times, at least 100 times, or at least 1,000 times the volumetric specific heat capacity of the combustible environment 130. The porous body 150 and/or ignition-quenching cover 110 may have a total heat capacity that is greater, typically much greater, than the total heat capacity of combustible environment 130 within the volume defined by the exterior dimensions of the corresponding porous body 150 and/or ignition-quenching cover 110. For example, the porous body 150, and/or components thereof, may have a total heat capacity that is at least 3 times, at least 10 times, or at least 30 times the total heat capacity of the combustible environment 130 within the volume defined by the exterior dimensions of the porous body 150. The porous body 150 of ignition-quenching cover 110 may have a thermal conductivity that is greater, typically much greater, than the thermal conductivity of combustible environment 130. For example, the porous body 150, and/or components thereof, may have a thermal conductivity that is at least 5 times, at least 10 times, at least 100 times, or at least 1,000 times the thermal conductivity of the combustible environment 130.

As a specific comparison, air and combustible gases have a volumetric specific heat capacity of about 1 kJ/(m³·K) (kilojoules per meter-cubed kelvin) and a thermal conductivity of about 0.03 W/(m·K) (watts per meter kelvin), while the comparable values for examples of ignition-quenching cover 110 materials are 2,000 kJ/(m³·K) and 0.25 W/(m·K) (for polyamide 6/6, also sold as NYLON 6/6 polymer), and 2,200 kJ/(m³·K) and 0.25 W/(m·K) (for polyether ether ketone (PEEK)).

The porous body 150 has pores 152, also called channels, paths, passages, etc., that extend through the porous body 150 across the thickness of the porous body 150. The thickness of the porous body is the thickness 158 of the ignition-quenching cover 110, where the porous body 150 defines the structure of the ignition-quenching cover 110 between the interior surface 140 and the exterior surface 142. In some regions of the ignition-quenching cover 110, the porous body 150 may not define the thickness 158 because other structures (such as a frame 180 as discussed further herein) may overlap and/or support the porous body 150 in those regions. The thickness of the porous body 150 and/or the thickness 158 of the ignition-quenching cover 110 may be at least 0.1 mm, at least 0.3 mm, at least 1 mm, at most 10 mm, at most 3 mm, and/or at most 1 mm.

A combustible substance in a given set of environmental conditions may be characterized by a quenching distance that is defined as the smallest diameter of a tube through which a flame front in the combustible substance may propagate. The pores 152 of the porous body 150 are sized and/or arranged to prevent a nascent flame front from passing through ignition-quenching cover 110. For instance, a characteristic pore size (e.g., a maximum cross-sectional dimension) of the pores 152 of the porous body 150 may be smaller than a quenching distance, or related parameter, of combustible environment 130, such that an ignition kernel and/or a nascent flame front that originates at fastener stack 114 (i.e., within enclosed volume 134) is quenched within the porous body 150 (in the interior volume 156 between the interior surface 140 and the exterior surface 142) before the ignition kernel and/or the flame front may reach exterior surface 142.

Generally, pores 152 have many turns, size changes, and/or interconnections across the thickness of the porous body 150 (e.g., between the interior surface 140 and the exterior surface 142). The characteristic pore dimensions are typically less than or substantially less than the thickness of the porous body 150. The pore sizes, pore shapes, and/or pore orientations may not be uniform among the pores 152. Therefore, the pores 152 may be characterized by a distribution of pore sizes, pore shapes, and/or pore orientations.

The porous body 150 may be characterized by the sizes of the respective pores 152 (such as the volumes, cross-sectional areas, and/or effective diameters of pores 152), and/or characteristics of the pores 152 (such as average effective diameter, spacing, and/or density). Pores 152 within the porous body 150 may be approximately equal in size (e.g., all pores 152 being substantially the same size) and may have a distribution of sizes. For example, porous body 150 may be characterized by a minimum, maximum, and/or average characteristic size of the pores 152 (e.g., the effective diameter of each pore 152). Generally, the effective diameters of the pores 152 of the porous body 150 are less than the quenching distance of the combustible environment 130 and sized to permit a pressure wave associated with an ignition event to flow through the porous body 150 and/or to dissipate within the porous body 150. The average effective diameter of pores 152 may be at least 0.1 mm (millimeters), at least 0.3 mm, at least 1 mm, at most 10 mm, at most 3 mm, at most 1.5 mm, at most 0.8 mm, and/or at most 0.3 mm. The porous body 150 may have a pore volume (i.e., the interior volume 156) that is greater than 50% comprised of pores 152 with an effective diameter between 0.01 mm and 1.5 mm, between 0.1 mm and 1 mm, or between 0.3 mm and 0.8 mm. The porous body 150 may have no pores 152 through the porous body 150 that have a minimum effective diameter greater than 1.5 mm, 1.0 mm, or 0.8 mm.

The ignition-quenching cover 110 and/or porous body 150 may be characterized by a porosity. The porosity of the ignition-quenching cover 110 and/or porous body 150 is the total open volume of the pores 152 divided by the exterior volume (i.e., the volume of the envelope) of the respective structure. The porosity of the respective structure may be described as the volume fraction of the pores 152 and/or the volume fraction not occupied by structural elements that define the pores 152. The porosity of the ignition-quenching cover 110 and/or the porous body 150 may be at least 1%, at least 2%, at least 5%, at least 10%, at least 20%, at least 50%, at least 80%, at least 90%, at least 95%, and at least 98%.

The porous body 150 may include, be, or consist essentially of one or more porous elements 154. The porous elements 154 may be layered and/or arranged to create the pores 152. Two or more (optionally all) porous elements 154 may have the same characteristics. In some embodiments, at least one of the porous elements 154 has characteristics (e.g., pore size, pore shape, pore orientation, material, etc.) that differ from other porous elements 154. For example, and as discussed further herein, porous body 150 may be constructed of sintered polymeric particles, forming a network of varied pores 152. As another example, and as also discussed further herein, porous body 150 may include two or more layers of porous elements 154 of fabric that together define convoluted, intertwined pores 152.

The ignition-quenching cover 110 may be configured to prevent the ignition of the combustible environment 130 by preventing a hot particle that is emitted from fastener stack 114 from travelling through the ignition-quenching cover 110 and/or the porous body 150. As used herein, the term "hot particle" refers to a particle that is emitted from the fastener stack 114 and/or due to an ignition source at the fastener stack 114 that has a size and/or a thermal energy sufficient to cause ignition of the combustible environment 130. The porous body 150 and/or ignition-quenching cover 110 may be configured such that there are no straight-line trajectories through a pore 152 in the porous body 150 from the interior surface 140 to the exterior surface 142. If such a straight-line trajectory exists, the size of the pores 152 may be small enough to prevent the traversal of particles having an effective diameter larger than a predetermined size. Particles traversing the ignition-quenching cover 110 along a convoluted (or at least a non-straight) path generally will collide with the porous body in the pores 152 and thereby lose at least a portion of their thermal and/or kinetic energy.

The pores 152 are interconnected to permit gas and/or liquid flow through the porous body 150. Hence, the porous body 150 may be described as gas permeable and/or liquid permeable. The porous body 150 may be configured to have significant flow resistance to gas flow and/or liquid flow (such as flow of liquid fuel) provided that the flow resistance is sufficiently low enough to withstand a pressure wave associated with an ignition source. Alternatively, the porous body 150 may be configured to have a relatively low resistance to gas flow through the porous body 150; gas may flow substantially freely through the porous body 150 and a pressure wave would be substantially unimpeded.

The porous body 150 and each porous element 154 may independently include and/or be formed of a polymer, a ceramic, a glass, a metal, a non-metal, a composite material, or combinations thereof. Examples of polymers include polypropylene, polystyrene, polyurethane, polyether ether ketone (PEEK), polytetrafluoroethylene (PTFE), polyimide, acetal, perfluoroalkoxy alkane (PFA), polyamide (e.g., NYLON-brand polymer), polyamide-imide (e.g., TORLON-brand polymer), epoxy, melamine phenolic, polybutylene terephthalate, ethylene vinyl acetate (EVA), polysulfide, and polysulfone. Examples of metals include aluminum, steel, and titanium. Examples of composite materials include filled polymers and fiber reinforced polymers (e.g., carbon-fiber reinforced polymer, fiberglass, and/or LYTEX-brand chopped fiber filled epoxy composite).

The porous elements 154 each independently may be a mass of bonded particles, a mass of sintered particles, a salt-templated polymer, an inverse-cast polymer, a mesh, a fabric (e.g., a woven fabric, a non-woven fabric, and/or a felt), a reticulated lattice, a truss network, a reticulated foam, and/or an open-cell foam. The porous body 150 and/or one or more of the porous elements 154 may include an exterior coating (i.e., the underlying materials may be coated with the exterior coating). The exterior coating generally is configured to decrease reactivity of the underlying materials, decrease susceptibility of the underlying materials to the combustible environment 130, and/or decrease electrical conductivity of the underlying materials. An example of an exterior coating is a parylene conformal coating.

The porous body 150 may include, and/or may be formed of, an electrically insulating material, which may serve to electrically isolate fastener stack 114 from the external volume 136 of combustible environment 130. Hence, the porous body 150 may be electrically insulating and/or may include no metals or electrically conductive components. In some embodiments, the porous body 150 may include electrically conductive components and/or materials. Electrically conductive components may be sensitive to electromagnetic effects and may be sized, shaped, and/or prepared to avoid electromagnetic effects that may lead to ignition events. For example, electrically conductive components may be coated with electrically insulating material, may be electrically grounded, and/or may be formed with no sharp features that could serve to produce a corona discharge.

The porous body 150 may be formed substantially of robust, resilient, and/or flexible materials that that may withstand use in the presence of the combustible environment. For example, use in a fuel tank may include rigors such as pressure, heat, and vibration. The porous body 150 may include and/or may be composed essentially of polymeric materials. In some embodiments, the porous body 150 may include rigid and/or brittle materials such as porous glass and/or porous ceramic elements.

A mass of bonded particles may be formed by aggregating particles into a desired form and coupling the particles together by chemical bonds (e.g., by solvent welding polymeric particles) and/or by adhesive. A mass of sintered particles may be formed by aggregating particles into a desired form and fusing the particles together by applying heat to sinter the particles together. Particles coupled by bonding and/or sintering may be particles of all the same material and/or size, or a mixed group of particles of different materials and/or sizes. For example, a mass of sintered particles may be formed by sintering a quantity of uniformly sized polyamide 6 spheres.

A salt-templated polymer may be formed by (1) partially fusing salt granules into an open porous network, (2) infiltrating a polymer precursor solution into the some or all of the open spaces in the salt network, (3) curing or drying the polymer, and (4) removing the salt network (e.g. by dissolving in water). Salt-templated polymers may include one or more polymer types. For example, a salt-templated polymer may be a porous salt-templated polysulfide. An inverse-cast polymer may be formed by (1) forming open porous template (e.g., via stereolithography, self-propagating photopolymer waveguides, or other additive manufacturing technique), (2) infiltrating a polymer precursor solution into the some or all of the open spaces in the open porous template to cast the structure, (3) curing or drying the polymer, and (4) removing open porous template through dissolution, etching, oxidation, etc. Inverse-cast polymers may include one or more polymer types. For example, an inverse-cast polymer may be a porous inverse-cast polysulfide.

A reticulated lattice and/or a truss network may be formed via stereolithography, self-propagating photopolymer waveguides, or other additive manufacturing technique. Lattice and/or truss structures may be layered to form a porous body 150 by using structures of different spacings and/or orientations for different layers.

Meshes and fabrics may have a standard US mesh size of about 16-200, 30-200, 60-200, or 100-200, corresponding to aperture sizes of at most 1,000 µm (micron), at most 600 µm, at most 250 µm, at most 150 µm, and/or at least 75 µm. Meshes and fabrics may be layered with each other and other types of porous elements 154. Woven meshes and/or fabrics may be flat woven or woven of tubular materials. Examples of fabrics include gauze and SEFAR-brand woven polymeric fabric (e.g., polyamide, PEEK, and/or PTFE). Examples of mesh and/or fabric layered porous bodies 150 include a non-woven fabric (e.g., a felt) sandwiched between woven fabrics.

The interior surface 140 is generally spaced away from the fastener stack 114 when the ignition-quenching cover 110 is installed. As illustrated in dot-dash line in FIG. 1, the interior surface 140 may engage, contact, and/or couple to the fastener stack 114 via one or more attachment features (cover attachment features 160 and fastener attachment features 210). Cover attachment features 160 are part of the ignition-quenching cover 110. Fastener attachment features 210 are part of the fastener stack 114. Generally, the cover attachment features 160 and the fastener attachment features 210 are complementary such that the ignition-quenching cover 110 may snap, thread, and/or mechanically interlock over the fastener stack 114 (typically during or after installation of the fastener stack 114 at the support structure 120). That is, the cover attachment features 160 and the fastener attachment features 210 may be configured to snap together, thread together, and/or mechanically interlock. Cover attachments features 160 and fastener attachment features 210 may include tabs, rims, threads, barbs, shoulders, etc. as described further herein with respect to the examples of FIGS. 2-18.

The cover attachment features 160 may be supported by and/or may be a part of a frame 180 of the ignition-quenching cover 110. The frame 180 is configured to provide mechanical structure to the ignition-quenching cover 110 sufficient to install the ignition-quenching cover 110, to hold the porous body 150 around the fastener stack 114, and/or to couple the ignition-quenching cover 110 to the fastener stack 114 and/or the support structure 120. Additionally or alternatively, the porous body 150 may have sufficient rigidity and/or resilience to serve one or more functions of the frame 180.

The frame 180 generally is non-porous and is configured to support the porous body 150. The frame 180 may form an exoskeleton around the porous body 150 (the frame 180 defining a portion of the exterior surface 142), may form an endoskeleton under the porous body 150 (the frame 180 defining a portion of the interior surface 140), and/or may form an internal skeleton in the porous body 150 (the frame 180 located at least partially inside the porous body 150). For example, and as shown schematically in FIG. 1, the frame 180 may form a ring at the base 146 of the ignition-quenching cover 110 that supports the porous body 150 that is shaped in a cup over the fastener stack 114. Though the example of FIG. 1 schematically illustrates the frame 180 at the base 146, the frame 180 may be located at the tip 148, the base 146, and/or between the tip 148 and the base 146.

The frame 180 may be coupled to the porous body 150 by bonding, fusing, and/or fastening the components together. For example, the porous body 150 may be coupled to the frame 180 by adhesive such as epoxy, cyanoacrylate, polyurethane, polysulfide, etc. As another example, the porous body 150 may be coupled to the frame 180 by sintering, welding, etc. (e.g., hot gas welding, polymer welding rod, hot plate welding, contact welding, high frequency welding, induction welding, friction welding, spin welding, laser welding, ultrasonic welding, and/or solvent welding). As yet another example, the porous body 150 and the frame 180 may have snap-fit features that are engaged to couple the porous body 150 to the frame 180.

The frame 180 generally is more rigid, more durable, more abrasion resistant, and/or more impact-resistant than the porous body. Though the frame 180 generally is non-porous and may block or limit some fluid flow through the porous body 150, the frame 180 is arranged to permit fluid flow through the ignition-quenching cover 110 as described herein. For example, the frame 180 may form and/or may block pores 152 at less than 50%, less than 20%, or less than 10% of the exterior surface 142 of the ignition-quenching cover 110. The frame 180 may include, and/or may be formed of, materials similar to or the same as the porous body 150. The frame 180 may include and/or be formed of a polymer, a ceramic, a glass, a metal, a non-metal, a composite material, or combinations thereof.

The frame 180 may include one or more elements that in combination form the frame 180. For example, the frame 180 may include an attachment structure 182 (as schematically illustrated in FIG. 1). The attachment structure 182 supports and/or defines the attachment feature(s) 160 of the ignition-quenching cover 110. The attachment structure 182 may be configured to protect the whole of the ignition-quenching cover 110, to protect the porous body 150 from damage (i.e., preserving combustion quenching capabilities), to establish and/or retain the shape of the ignition-quenching cover 110, to ease handling of the ignition-quenching cover 110, and/or to facilitate installation of the ignition-quenching cover 110. The attachment structure 182 may be at the base 146 of the ignition-quenching cover 110 as represented in FIG. 1 but need not be at the base 146. The attachment structure 182 may be configured to contact the support structure 120 and/or to be coupled to the support structure 120.

The frame 180 may include a cap structure 184 that encompasses the tip 148 of the ignition-quenching cover 110. The cap structure 184 may be configured to protect whole of the ignition-quenching cover 110, to protect the porous body 150 from damage (i.e., preserving combustion quenching capabilities), to establish and/or retain the shape of the ignition-quenching cover 110, to ease handling of the ignition-quenching cover 110, and/or to facilitate installation of the ignition-quenching cover 110. In some embodiments, the cap structure 184 is an attachment structure 182 (i.e., defining and/or supporting attachment features 160). The cap structure 184 may be configured to resist damage from the fastener stack 114 contacting the ignition-quenching cover 110 and/or to resist damage from external objects contacting the ignition-quenching cover 110 (such as a tool impact).

The base 146 of the ignition-quenching cover 110 is generally in contact with the support structure 120. Where the base 146 does not contact the support structure 120, there is a spacing 138 (also referred to as a gap) between the base 146 of the ignition-quenching cover 110 and the support structure 120. The spacing 138 may be at least partially filled with a spacer (e.g., an O-ring, a gasket) and/or an adhesive (e.g., epoxy, cyanoacrylate, polyurethane, polysulfide, etc.). Unfilled regions of the spacing 138 are sized and/or arranged to prevent a nascent flame front and/or a hot particle from propagating around the ignition-quenching cover 110 (through the spacing 138) and potentially igniting the combustible environment 130 in the external volume 136. For example, the unfilled regions of the spacing 138 may have dimensions smaller than the quenching distance, or related parameter, of the combustible environment 130. The maximum distance between the base 146 and the support structure that is not filled (i.e., unfilled regions of the spacing 138) may be less than 1 mm, less than 0.8 mm, or less than 0.5 mm.

The ignition-quenching cover 110, the porous body 150, and/or the frame 180 may be configured to limit or prevent water contact, ice accumulation, and/or biofouling on the ignition-quenching cover 110. For example, the exterior surface 142 may be hydrophobic and/or may have an exterior layer 196 that is hydrophobic. As another example, the pores 152 may be configured to repel water. Additionally or alternatively, the exterior surface 142, the exterior layer 196, and/or the porous body 150 may be opaque to facilitate inspection of the integrity of the ignition-quenching cover 110 and/or to prevent light emanating from the fastener stack 114 from traversing the ignition-quenching cover 110. The exterior layer 196 (which may be referred to as the exterior coating, the outer layer, and/or the outer coating) may cover at least a portion (optionally all) of the exterior of the porous body 150 and/or the frame 180.

The support structure 120 may be a plate, a sheet, and/or a web of material. Proximate to the fastener stack 114, at the fastener site 122, the support structure 120 defines a local plane. The fastener stack 114 extends beyond the local plane of the support structure 120 at the fastener site 122. The fastener stack 114 that extends beyond the local plane of the support structure 120 would be exposed to the combustible environment 130 and potentially would present a risk of an ignition event. However, the ignition-quenching cover 110 when installed over the fastener stack 114 isolates the enclosed volume 134 of the combustible environment 130 around the fastener stack 114 from the external volume 136 of the combustible environment 130. Ignition of the combustible environment 130 that occurs within the enclosed volume 134 does not propagate to the external volume 136 and does not ignite the combustible environment 130 in the external volume 136.

The fastener stack 114 may be coupled to, extend from, and/or protrude from support structure 120 such that at least a portion of fastener stack 114 is in contact with combustible environment 130 when combustible environment 130 is present. The fastener stack 114 may extend fully through support structure 120, may terminate within support structure 120, or may be supported by and/or coupled to support structure 120 without penetrating support structure 120. The fastener stack 114 may join and/or couple support structures 120 together and/or to other structures. The fastener stack 114 may support and/or may be supported by support structure 120.

The fastener stack 114 may be electrically isolated or electrically connected to support structure 120. The support structure 120 generally includes a structure (such as a plate) that is non-metallic and that may be less electrically conductive than fastener stack 114. The support structure 120 may include and/or may be an electrical insulator (electrically non-conductive) and/or a poor electrical conductor. The support structure 120 also may include an electrical conductor such as electrically-conductive filler and/or reinforcement material (e.g., metallic filler and/or carbon fiber), and/or may include an electrically-conductive layer (e.g., metallic film, metal plate, etc.). The support structure 120 may include, and/or may be constructed of, a polymer (e.g., polyurethane), a composite material (e.g., a carbon fiber-reinforced polymer (CFRP) and/or fiberglass), a ceramic, and/or a metal.

As a specific example of the ignition-quenching system 100, the ignition-quenching system 100 may be at least a portion of a fuel tank, such as a wing fuel tank in a composite wing aircraft. The fastener stack 114 may be a fastener exposed to the fuel volume and/or ullage space (e.g., extending into the interior of the fuel tank) and embedded in and/or coupling one or more support structures 120 which contact the fuel volume and/or ullage space. The support structures 120 may be carbon-fiber composite panels, partitions, stringers, etc. that are in the interior of the fuel tank and/or define at least a portion of the interior of the fuel tank. The ignition-quenching cover 110 covers the fastener stack 114 and is collocated with the fastener stack 114. The ignition-quenching cover 110 is porous and permits fuel vapor to contact the fastener stack 114. An ignition source associated with the fastener stack 114 may develop and trigger an ignition event at the fastener stack 114. For example, due to, e.g., a lightning strike or the friction of fuel movement, electrical charge and/or an electrical voltage may develop at the fastener stack 114 sufficient to cause an electrical discharge or other potential ignition source. The ignition event includes an ignition kernel, a nascent flame front, and/or a pressure wave within the enclosed volume 134 of the ignition-quenching cover 110. The ignition kernel is quenched by the ignition-quenching cover 110; the nascent flame front is quenched as it traverses the ignition-quenching cover 110; and/or the pressure wave may be dissipated and/or impeded by the ignition-quenching cover 110.

In addition to mitigating the immediate effects of an ignition event, the ignition-quenching cover 110 may be lighter than a conventional cap seal and may permit larger fuel volumes than a conventional cap seal. In particular, aircraft wing fuel tanks may include many hundreds of fasteners which may be protected by ignition-quenching covers 110. A small weight savings in an individual cover may amount to a large net weight savings for the aircraft. Conventional cap seals are not porous and exclude fuel from a volume around each fastener stack. The ignition-quenching cover 110 is porous and may permit fuel to substantially fill the enclosed volume 134 and/or the interior volume 156 of the ignition-quenching cover 110. The small fuel volume increase associated with each ignition-quenching cover 110 may contribute significantly to the total fuel volume and the efficiency of operation of the aircraft. Further, the resiliency of ignition-quenching covers 110 (generally withstanding ignition sources and/or ignition events without damage) may reduce the amount, frequency, and/or complexity of maintenance and/or inspection of the wing fuel tank as compared to a wing fuel tank incorporating conventional cap seals.

Though the aircraft wing fuel tank example is detailed to explain some potential advantages of use of the ignition-quenching cover 110, the ignition-quenching cover 110 may be utilized and/or incorporated within other examples and/or ignition-quenching systems 100. For example, ignition-quenching cover 110 may be useful in other applications requiring ignition hazard consideration, including fuel transport, fuel storage, mining operations, chemical processing, metal fabrication, power plant construction and operation, and operations which involve combustible particulate such as suspended dust, sawdust, coal, metal, flour, and/or grain.

Ignition-quenching cover 110, and components thereof, may be configured to withstand, and/or to operate at, a wide range of temperatures. Hence, ignition-quenching cover 110 may retain its structural integrity and its ignition-quenching capability when exposed to and/or operating in a high temperature, a low temperature, and/or temperature cycles. Examples of temperature extremes and/or ranges include less than 80° C., less than 60° C., less than 40° C., less than 20° C., less than 0° C., greater than −80° C., greater than −60° C., greater than −40° C., greater than −20° C., and/or greater than 0° C. For example, aircraft may experience temperatures in excess of 40° C. (e.g., while on the tarmac) and below 60° C. (e.g., while at altitude).

Ignition-quenching systems 100 may be further understood with reference to the following examples and with reference to FIGS. 2-18.

Figure 2:
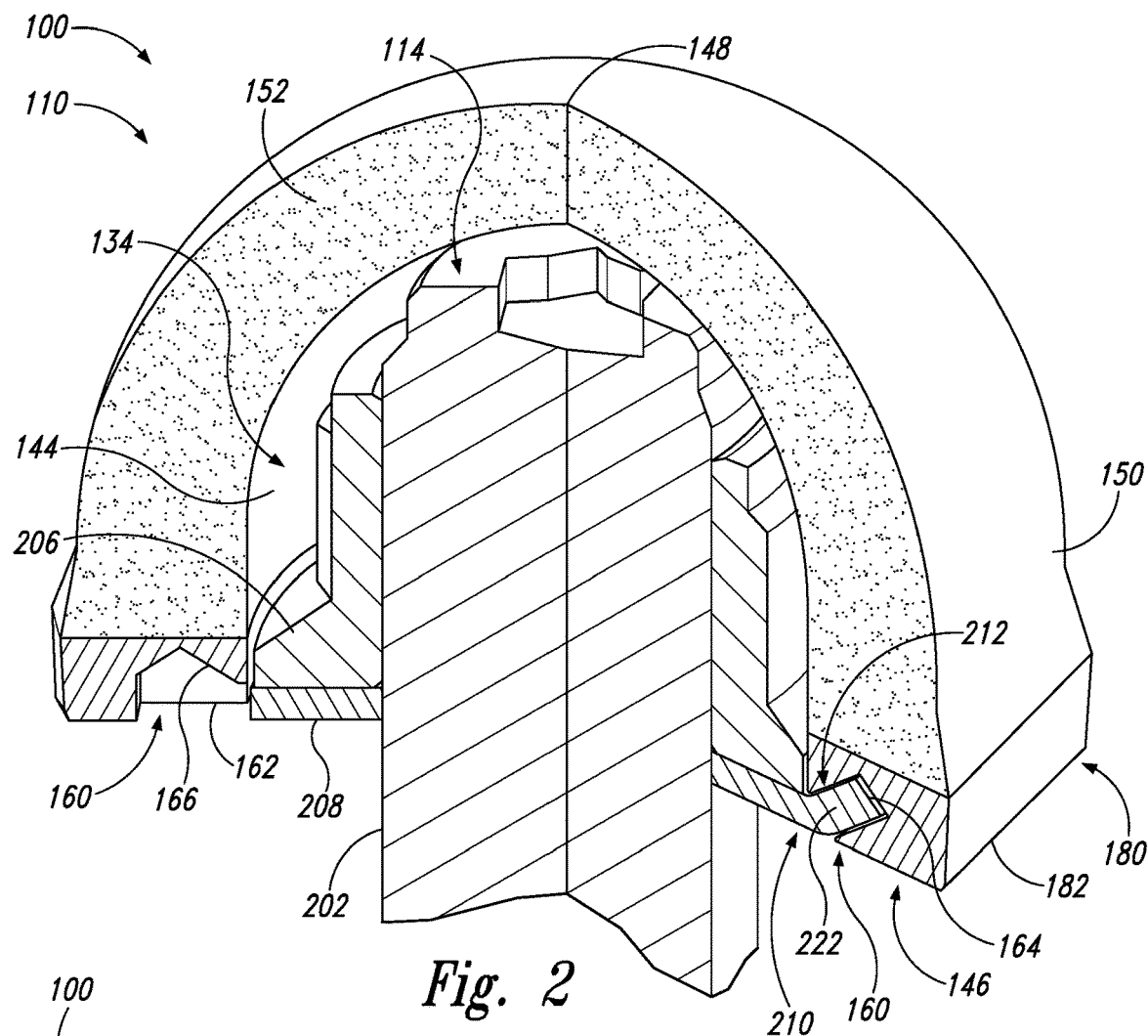
FIG. 2 is a cross sectional view of an example of an ignition-quenching cover installed on an example of a fastener stack.
Figure 3:
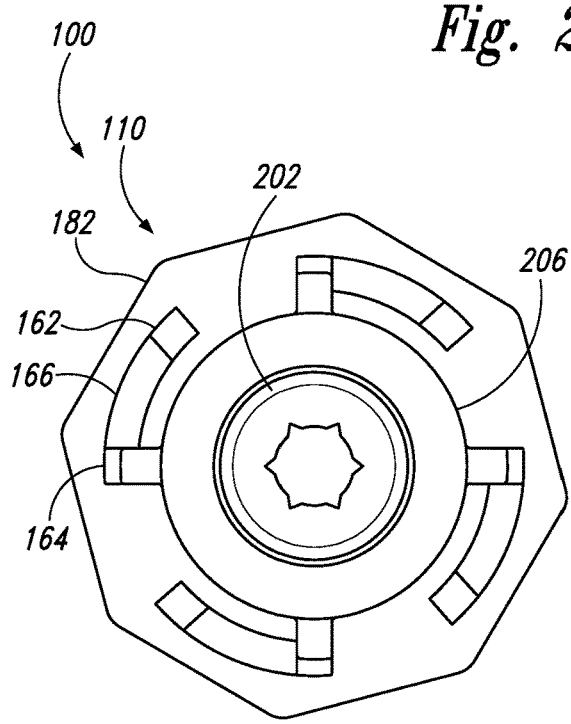
FIG. 3 is a top view of the structure of FIG. 2.
Figure 4:
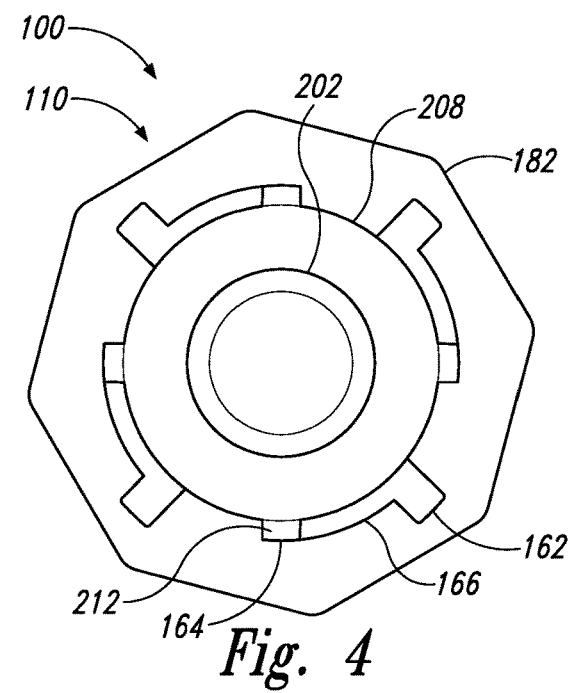
FIG. 4 is a bottom view of the structure of FIG. 2.

FIGS. 2-4 illustrate an example of the ignition-quenching system 100 in which the ignition-quenching cover 110 is coupled to the fastener stack 114 by a twist lock mechanism. The ignition-quenching cover 110 may be coupled to the fastener stack 114 by placing the ignition-quenching cover 110 over the fastener stack 114 and by twisting the ignition-quenching cover 110 relative to the fastener stack 114 a small fraction of a turn (typically about one eighth of a turn). The washer 208 of the fastener stack 114 includes the fastener attachment features 210, specifically, a series of radially protruding tabs 212. The attachment structure 182 of the ignition-quenching cover 110 includes the cover attachment features 160, including a series of entry slots 162 at the base 146 of the ignition-quenching cover 110.

In the example of FIGS. 2-4, the tabs 212 are a portion of the washer 208. However, the tabs may be coupled to or an integral portion of any of the components of the fastener stack 114 such as the washer 208, the nut 206, the coupling element 204, and/or the fastener 202. The tabs 212 do not need to be aligned with the base 146 of the ignition-quenching cover 110 and may be along the fastener stack 114 at a position that is separated (raised) from the support structure 120 (not shown in FIGS. 2-4). In the example of FIGS. 2-4, the ignition-quenching cover 110 includes the attachment structure 182 which defines the attachment features 160. However, the attachment features 160 may be defined in the porous body 150 and the ignition-quenching cover 110 may not include the attachment structure 182.

The tabs 212 and the entry slots 162 are configured to fit together such that the ignition-quenching cover 110 may be applied over the fastener stack 114 after the fastener stack 114 is installed in the support structure 120. The entry slots 162 are connected to locking ramps 166 and then to retention slots 164. The locking ramps 166 are configured to guide the tabs 212 from the entry slots 162 to the retention slots 164. The locking ramps 166 guide the tabs 212 away from the base 146 of the ignition-quenching cover 110. Additionally or alternatively, the tabs 212 may guide the locking ramps 166 toward the base 146 and the underlying support structure 120. Hence, the tabs 212 and/or the locking ramps 166 may be flexible and/or coupled to the respective structure with a flexible arm. At the end with the retention slot 164, the locking ramp 166 terminates at a point that is above (further from the base 146) than the base of the retention slot 164. Hence, the ignition-quenching cover 110 may be installed with the tabs 212 in the entry slots 162. A twist of the ignition-quenching cover 110 causes the tabs 212 to be driven up the locking ramps 166 until the tabs 212 clear the locking ramps 166. Once the tabs 212 clear the locking ramps 166, the tabs 212 may snap into the retention slots 164 and/or the locking ramps 166 may snap into place to hold the tabs 212 in the retention slots 164. The tabs 212 and/or the locking ramps 164 may make an audible click as the tabs 212 are retained in the retention slots 164 (e.g., to indicate proper installation). Because of the height differential between the locking ramps 166 and the retention slots 164, the tabs 212 are trapped in the retention slots 164 (or at least more force may be required to remove the ignition-quenching cover 110 than to install it). The locking features help to keep the ignition-quenching cover 110 in place at the fastener stack 114 and to resist dislodgement due to vibration and/or environmental perturbations.

The tabs 212 may have inclined tips 222 that project away from the support structure 120 when the fastener stack 114 is installed. The inclined tips 22 may facilitate engagement of the tabs 212 with the locking ramps 166. The ignition-quenching cover 110 and/or the attachment structure 182 may have external features to facilitate twisting the ignition-quenching cover 110 (applying torque) to lock the tabs 212 in the retention slots 164. The external features may be configured to accept a socket wrench, e.g., a square, hexagonal, octagonal, or a star profile.

Though the example of FIGS. 2-4 illustrates four tabs 212, and four corresponding cover attachment features 160 (i.e., sets of entry slots 162, locking ramps 166, and retention slots 164), the ignition-quenching system 100 may include one or more tabs 212 and corresponding cover attachment features 160. Further, the tabs 212 may be circumferentially distributed substantially uniformly (as shown) or asymmetrically.

Figure 5:
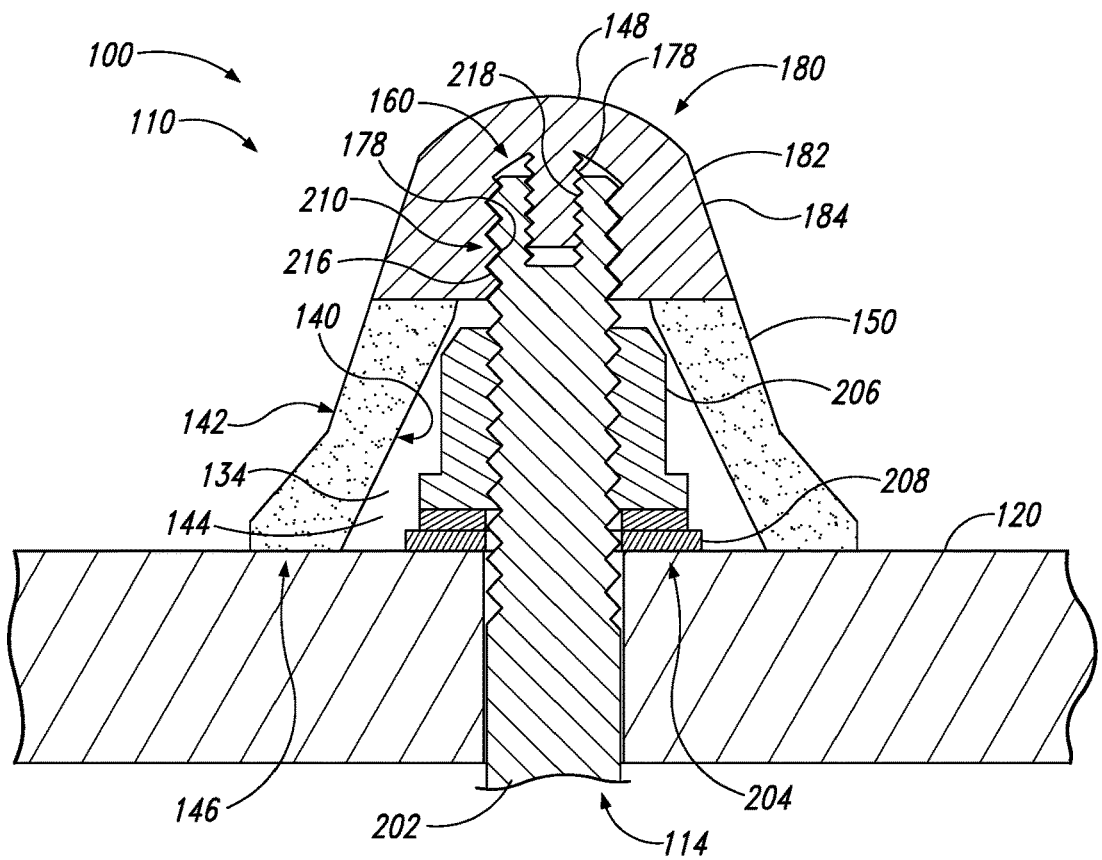
FIG. 5 is a cross sectional view of an example of an ignition-quenching system showing mating thread structures.

FIG. 5 illustrates an example of the ignition-quenching system 100 in which the ignition-quenching cover 110 is coupled to the fastener stack 114 by mating threads. The cover attachment features 160 are attachment threads 178. The attachment threads 178 may be coupled to or formed in the attachment structure 182 (as shown) and/or the porous body 150. The attachment structure 182 and the attachment threads 178 may be configured to engage fastener threads 216 of the fastener 202. The fastener threads 216 are threads that are configured to engage the coupling element(s) 204 (such as nuts 206) to install the fastener stack 114 at the support structure 120. The fastener threads 216 may be exposed above the coupling elements 204 such as nuts 206 and/or washers 208. Hence, the attachment threads 178 are at the interior surface 140 of the ignition-quenching cover 110. The attachment structure 182 may cover the tip 148 of the ignition-quenching cover 110 and the attachment structure 182 may serve as the cap structure 184.

The attachment threads 178 of the ignition-quenching cover 110 may be configured to engage other threaded structures 218 of the fastener stack 114. The threaded structures 218 may be internal threads in the top of the fastener 202 as indicated in dotted line in FIG. 5. The threaded structures 218 may be secondary external threads at the top of the fastener 202 (e.g., threads of a different pitch and/or diameter than the fastener threads 216) or external threads formed into and/or formed by the coupling elements 204.

The ignition-quenching cover 110 with the attachment threads 178 may be applied over the fastener stack 114 after the fastener stack 114 is installed in the support structure 120. The ignition-quenching cover 110 may then be threaded onto the fastener threads 178 or other threaded structure 218 until the base 146 of the ignition-quenching cover 110 contacts the support structure 120 or forms a spacing 138 (not shown in FIG. 5) that is less than a predetermined threshold.

The ignition-quenching cover 110 and/or the attachment structure 182 may have external features to facilitate turning the ignition-quenching cover 110 (applying torque) to thread the attachment threads 178 to the fastener threads 216 or the threaded structures 218. The external features may be configured to accept a socket wrench, e.g., a square, hexagonal, octagonal, or a star profile.

Figure 6:
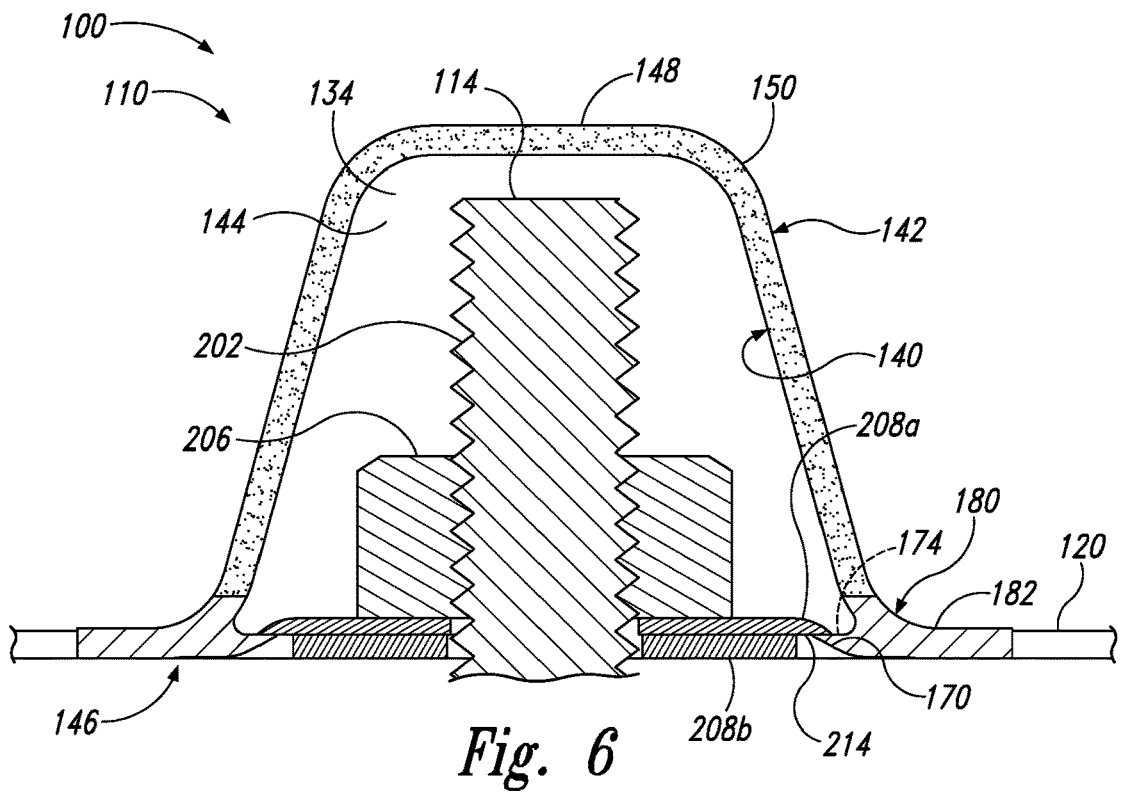
FIG. 6 is a cross sectional view of an example of an ignition-quenching system showing a push-style snap lock coupling.

FIG. 6 illustrates an example of the ignition-quenching system 100 in which the ignition-quenching cover 110 is coupled to the fastener stack 114 by a push-style snap lock coupling. The cover attachment feature 160 is one or more rims 170 (also called lips or tabs). The rim 170 may be coupled to or formed in the attachment structure 182 (as shown) and/or the porous body 150. The attachment structure 182 and the rim 170 are configured to engage the corresponding fastener attachment feature 210 of the fastener 202. The fastener attachment feature 210 is one or more shoulders 214 (also called catches or tabs). The shoulder 214 is a surface that engages the rim 170 and entraps the rim 170 between the shoulder 214 and the support structure 120.

The rim 170 may be a continuous annular rim (spanning the entire inner circumference of the ignition-quenching cover 110) or the cover attachment feature 160 may be one or more rims 170 arranged around the inner circumference of the ignition-quenching cover 110. The rims 170 may be substantially uniformly distributed or asymmetrically distributed about the inner circumference of the ignition-quenching cover 110.

In the example of FIG. 6, the rim 170 is formed at the base 146 of the ignition-quenching cover 110 as an annular protrusion. The rim 170, and/or supports connecting the rim 170 to the attachment structure 182 and/or the porous body 150 (e.g., arms 174 as also discussed herein with respect to the examples of FIGS. 7 and 8), are configured to flex as the ignition-quenching cover 110 is pushed down to the support structure 120. When the rim 170 is pushed past the shoulder 214, the rim 170 relaxes into the position shown in FIG. 6 in which the rim 170 is entrapped between the shoulder 214 and the support structure 120.

Figure 7:
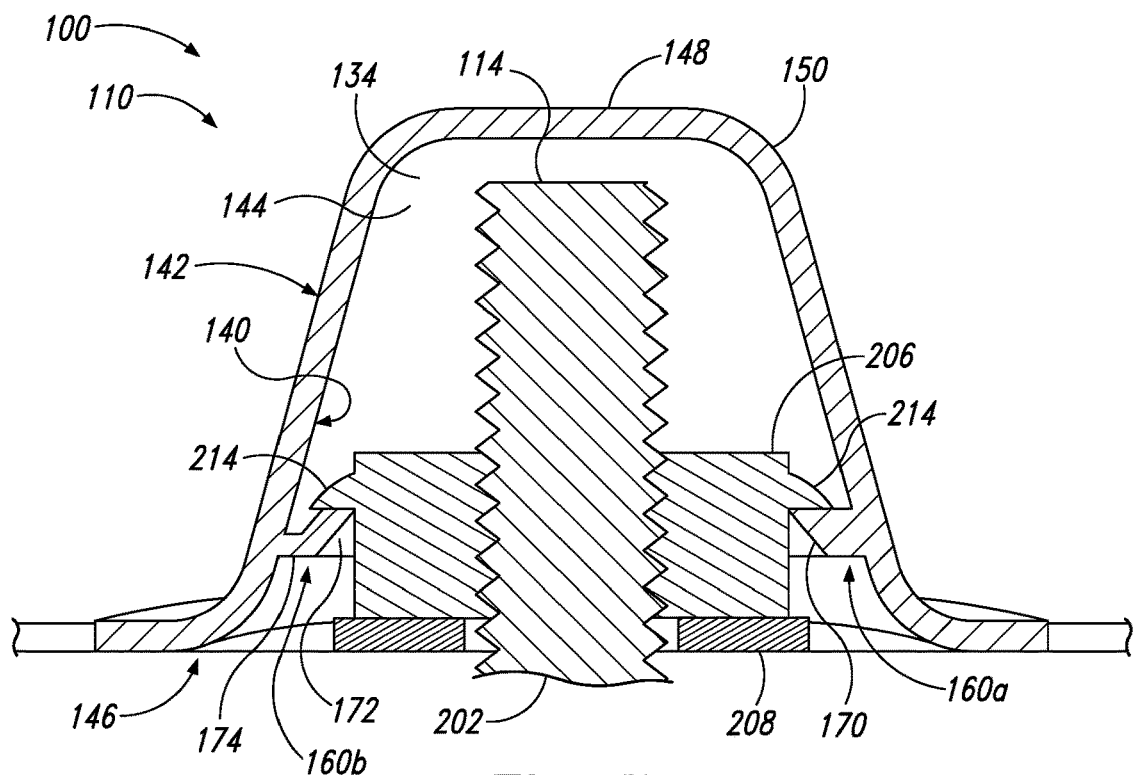
FIG. 7 is a cross sectional view of an example of an ignition-quenching system showing other snap lock couplings.

In the example of FIG. 7, the rim 170 may be formed further above the base 146 of the ignition-quenching cover 110, as shown with the cover attachment feature 160a on the right side of FIG. 7. One or more rims 170 (optionally all rims 170) may be rim structures that include a barb 172 and an arm 174, as shown with the cover attachment feature 160b on the left side of FIG. 7. The arm 174 is a flexible element that spaces the barb 172 away from the main interior surface 142 of the ignition-quenching cover 110. More generally, arm 174 may be used as an intermediate structure between a functional end structure, such as locking ramp 166, tab 168, rim 170, barb 172, tab 212, shoulder 214, etc., and the respective supporting structure, such as porous body 150, frame 180, and/or fastener stack 114. The arm 174 is a flexible element and is configured to flex to transmit less stress to the supporting structure than if a rigid element were used. Transmitting less stress to other components of the ignition-quenching cover 110 and/or the fastener stack 114 may protect the integrity of the ignition-quenching cover 110 and/or the fastener stack 114 during installation. The arm 174 in the example of FIG. 7 is configured to flex such that the barb 172 may be pushed past the shoulder 214 as the ignition-quenching cover 110 is pushed down to the support structure 120. When the barb 172 is pushed past the shoulder 214, the arm 174 relaxes to engage the barb 172 under the shoulder 214 and generally entraps the barb 172 between the shoulder 214 and the support structure 120.

The shoulder 214 may be a continuous annular shoulder (spanning the entire circumference of the fastener stack 114) or the fastener attachment feature 210 may be one or more shoulders 214 arranged around the circumference of the fastener stack 114. The shoulders 214 may be substantially uniformly distributed or asymmetrically distributed about the circumference of the fastener stack 114.

In the example of FIG. 6, the shoulder 214 is formed by a combination of two washers 208, labelled 208a (an upper, larger washer) and 208b (a lower, smaller washer). The underside of the upper washer 208a forms the shoulder 214 in the recess formed by the lower washer 208b between the upper washer 208a and the support structure 120. The shoulder(s) 214 do not need to be formed by the washers 208 or next to the support structure 120. The shoulder(s) 214 may be formed by a single contoured, panned, or grooved washer 208 that presents the shoulder 214 in a recess between the washer 208 and the support structure. As another example and as shown in FIG. 7, the shoulder(s) may be formed by the base of the nut 206 and/or a radial protrusion of the nut 206 (or a structure coupled to the nut 206).

Figure 8:
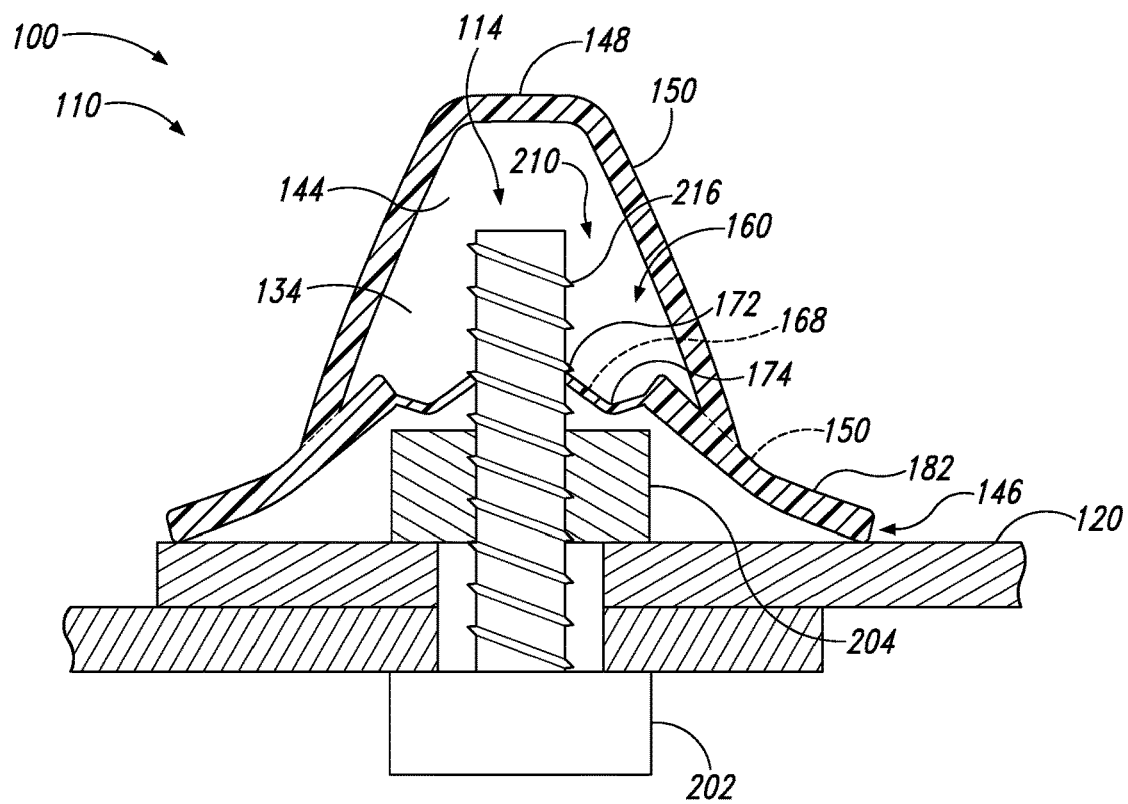
FIG. 8 is a cross sectional view of an example of an ignition-quenching system showing a barb coupling to a fastener stack.

FIG. 8 illustrates an example of the ignition-quenching system 100 in which the ignition-quenching cover 110 is coupled to the fastener stack 114 by barbs 172 and fastener threads 216. The cover attachment features 160 may include one or more barb 172 and arm 174 structures (also referred to as tabs 168). As with the example of FIG. 7, the arm 174 is a flexible element. In this example, the arm 174 is configured to flex such that the barb 172 may be pushed past one or more elements of the fastener threads 216, which serve as the fastener attachment structures 210. The arms 174 also bias the barbs 172 toward the fastener threads so that a series of barbs 172 may securely engage the fastener threads (similar to a push nut). As the ignition-quenching cover 110 is pushed down to the support structure 120, the barbs 172 engage various elements of the fastener threads 210.

The example of FIG. 8 also illustrates a flexible attachment structure 182 and/or flexible porous body 150 along the base 146 of the ignition-quenching cover 110. The flexible attachment structure 182 and/or flexible porous body 150 may be referred to as a flexible region or a compressible interface. As the ignition-quenching cover 110 is pushed down to engage the cover attachment features 160 and the fastener attachment features 210, the flexible region may contact and flex to form a continuous contact and/or a broader contact with the support structure 120. The flexible region may at least partially conform (optionally it may completely conform) to the support structure 120 to form an extended contact with the support structure 120 around the fastener stack 114. The flexible region may be in the form of a bellows, a series of flaps, or a continuous flexible skirt. The attachment structure 182 and/or the ignition-quenching cover 110 may include flexible elements, such as an O-ring or a gasket, to engage the support structure 120. The flexible structures to contact the support structure 120 described with respect to FIG. 8 are not limited to the embodiment of FIG. 8. The flexible structures may be combined with other embodiments, e.g., as described with respect to the other examples described herein.

Figure 9:
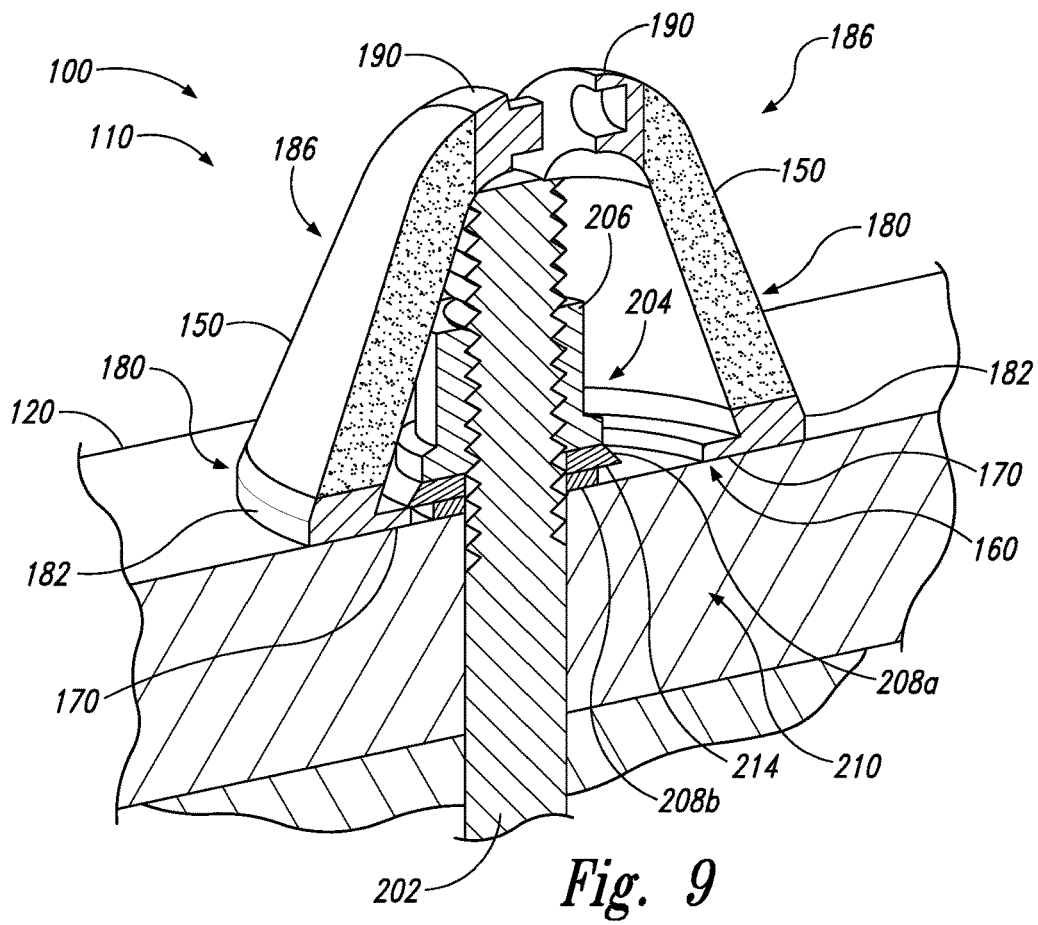
FIG. 9 is a cross sectional view of an example of an ignition-quenching system showing mating cover members.
Figure 10:
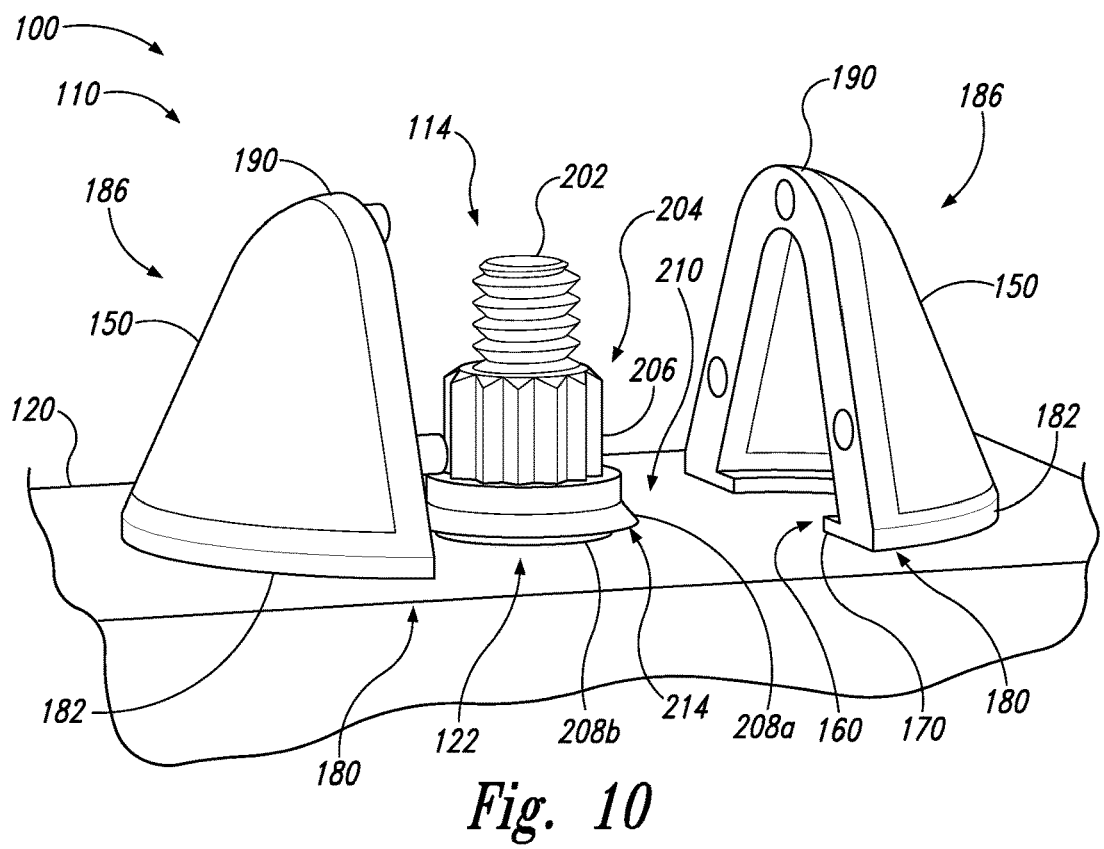
FIG. 10 is a perspective view of the ignition-quenching system of FIG. 9.

FIGS. 9 and 10 illustrate an example of the ignition-quenching system 100 in which the ignition-quenching cover 110 includes two or more mating cover members 186 (e.g., a pair as illustrated in FIGS. 9 and 10). The cover members 186 are configured to couple selectively together to form the ignition-quenching cover 110. The cover members 186 may be independent components or may be coupled together (e.g., with a hinge or link in a clam shell configuration). The cover members 186 may be assembled around the fastener stack 114 after the fastener stack is installed at the support structure 120.

One or more of the cover members 186 may be configured to fit into and/or interlock with fastener attachment features 210. Thus, the cover members 186 may be configured to mate with the fastener stack received within the ignition-quenching cover. As shown in the example of FIGS. 9 and 10, coupling elements 204 may form a shoulder 214 (between larger, upper washer 208a and smaller, lower washer 208b). One or both of the cover members 186 may include cover attachment features 160 such as the rim 170 that fit within the recess formed by the washers 208a, 208b and/or that contacts the shoulder 214. Cover members 186 may be laterally brought to the fastener stack 114 with the shoulder 214 with the rim(s) 170 aligned under the shoulder 214.

The cover members 186 may each include frame elements. For example, each cover member 186 may include the attachment structure 182, a component of the attachment structure 182, the cap structure 184 (not shown in FIGS. 9 and 10), a component of the cap structure 184, and/or a mating structure 190. When the cover members 186 are coupled together, the frame elements combine to form the frame 180. For example, each cover member 186 may include an attachment structure component that combined form the attachment structure 182. The mating structures 190 are configured to couple to complementary mating structures 190 of other cover members 186. The mating structures 190 may include snaps, catches, latches, clamps, and/or fasteners. For example, and as shown in FIGS. 9 and 10, the mating structures 190 may include snaps and receptacles to connect the cover members 186 in a snap-fit arrangement. Additionally or alternatively, the cover members 186 may be coupled together by bonding and/or fusing (e.g., by adhesive, solvent welding, and/or heat bonding). As shown in FIG. 10, the mating structures 190 may be formed integrally with other frame elements such as the attachment structure 182.

Figure 11:
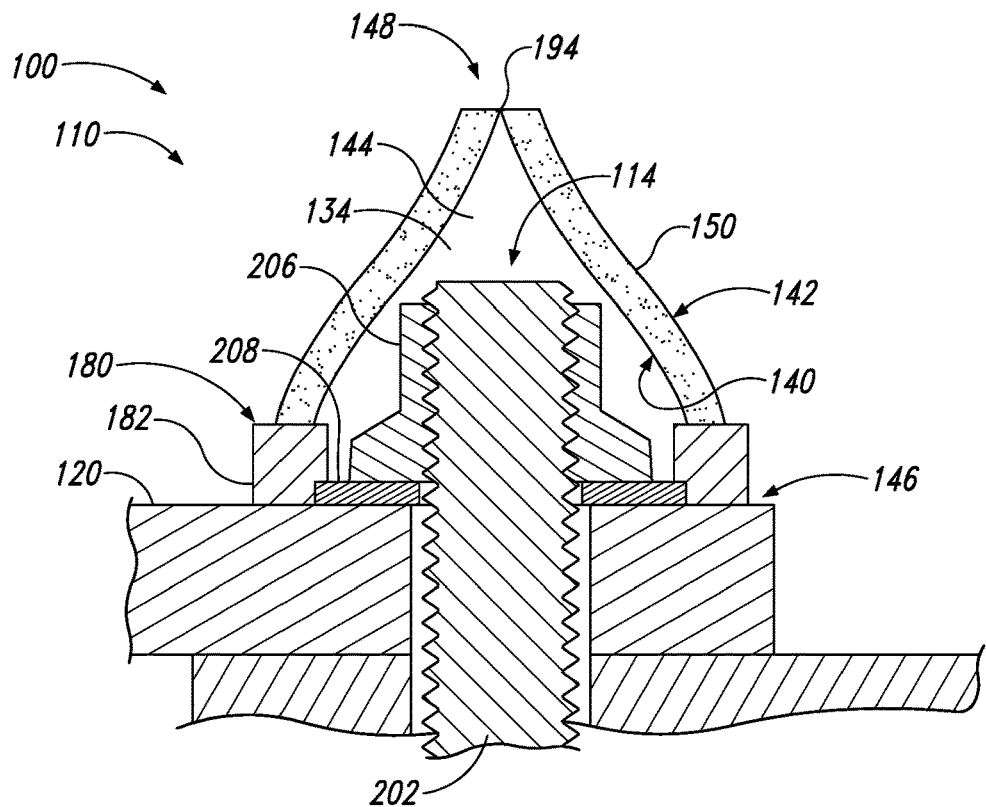
FIG. 11 is a cross sectional view of an example of an ignition-quenching system showing a porous body with a seam.

As shown in FIG. 11, the porous body 150 and/or the ignition-quenching cover 110 may be formed with a seam 194, generally at or near the tip 148. The ignition-quenching cover 110 may have an opening at the tip 148 prior to installation (an open top configuration). The open-topped ignition-quenching cover 110 may be assembled with the fastener stack 114 as the fastener stack 114 is installed at the support structure 120 or may be installed around the fastener stack 114 after the fastener stack 114 is installed at the support structure 120. The open top configuration permits inspection of the fastener stack 114 after installation of the fastener stack 114 and/or the ignition-quenching cover 110, and permits installation of the fastener stack 114 through the ignition-quenching cover 110.

Once the ignition-quenching cover 110 is installed, the opening may be sealed with the seam 194 to form the enclosed volume 134 and the cavity 144 around the fastener stack 114. The porous body 150 may be flexible and/or elastic enough to manipulate to form the seam 194. The porous body 150 may be in a substantially cylindrical form in the open top configuration.

Figure 12:
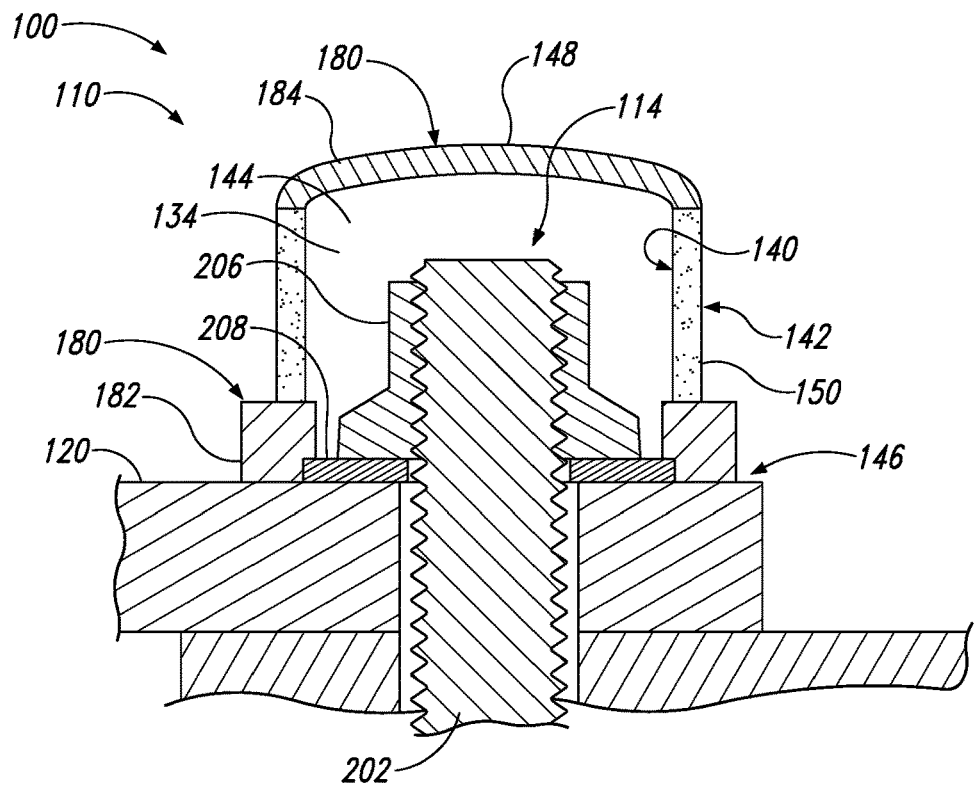
FIG. 12 is a cross sectional view of an example of an ignition-quenching system showing a cap structure.

FIG. 12 illustrates the cap structure 184 at the tip 148 of the ignition-quenching cover 110. The cap structure 184 does not need to contact the fastener stack 114 (but may in some embodiments and under certain circumstances). The cap structure 184 may be an element of the frame 180 that is independent of other elements of the frame 180, such as the attachment structure 182. The cap structure 184 may extend across the top of the fastener stack 114 and may extend toward the base 146 of the ignition-quenching cover 110.

Figure 13:
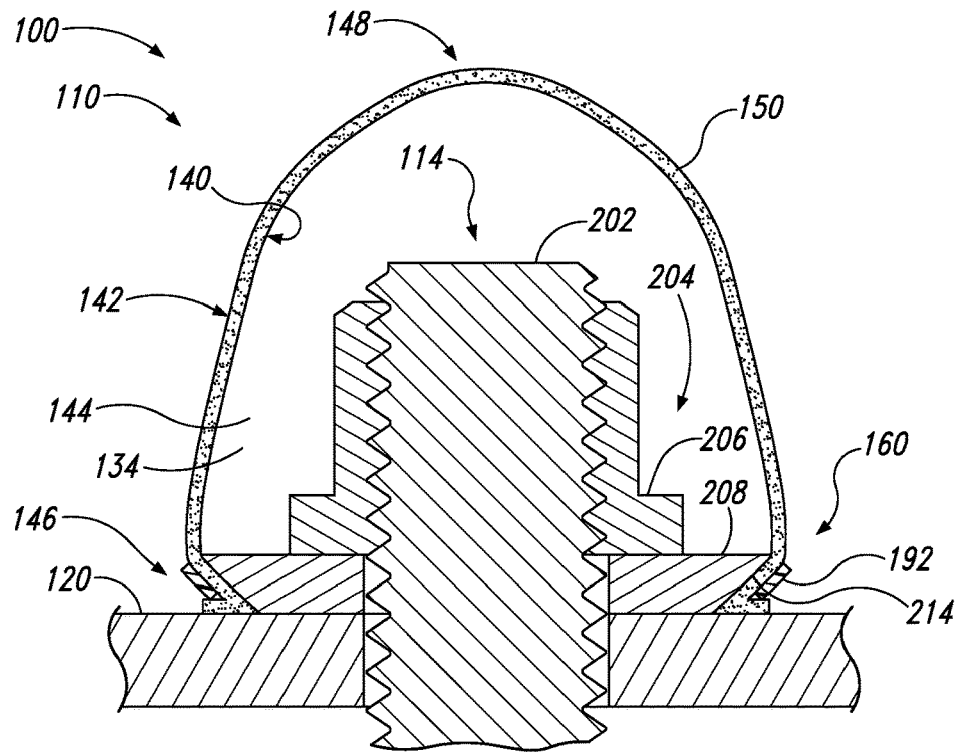
FIG. 13 is a cross sectional view of an example of an ignition-quenching system showing a locking clip coupling.

FIG. 13 illustrates an example of the ignition-quenching system 100 in which the ignition-quenching cover 110 is coupled to the fastener stack 113 by a locking clip 192. The locking clip 192 is configured to mechanically interlock the ignition-quenching cover 110 to the fastener stack 114. Generally, the locking clip 192 fits around or through the fastener stack 114 and/or the ignition-quenching cover 110 to clamp the ignition-quenching cover 110 to the fastener stack 114.

In the example of FIG. 13, the cover attachment feature 160 is a flexible portion of the porous body 150 that fits over the washer 208 of the fastener stack 114. The fastener attachment feature 214 is the shoulder 214 of the washer 208. When installed on the fastener stack 114, the flexible cover attachment feature 160 extends loosely over the shoulder 214. The locking clamp 192 generally is a strap or band that fits over the flexible cover attachment features 160 and that is configured to apply radial pressure to clamp the flexible cover attachment feature 160 to the washer 208 at the shoulder 214. Generally, the locking clip 192 is not electrically conductive and may be formed of polymeric and/or composite materials.

The locking clamp 192 may be a strap clamp (e.g., a worm-gear style clamp, a spring-style pinch clamp, a ratchet-style clamp (e.g., a zip tie). Additionally or alternatively, the locking clamp 192 may include a flexible tie (e.g., a twist tie), shrink-fit material, and/or grow-fit material. Either of shrink-fit materials and grow-fit materials may be referred to as size-changing materials. Shrink-fit material (which may be referred to as shrink-wrap material) and grow-fit material are configured to change size (either shrink or grow) upon application of energy. Typically, shrink-fit materials are formed by stretching a material while the material is in a pliable state and then setting the material (typically by cooling) in the stretched state. Upon application of energy (such as heat, radiation, a chemical reagent), the material may substantially return (shrink) to the unstretched state. Grow-fit materials may be formed similarly except that the pliable material is generally compressed in its pliable state. Upon application of energy, the grow-fit material may substantially return (grow) to the uncompressed state. In some embodiments, the porous body 150 and/or the attachment structure 182 may include shrink-fit and/or grow-fit materials that, when activated, shrink and/or grow, to mechanically interlock with the fastener stack 114. In such embodiments, no locking clamp 192 may be needed.

Figure 14:
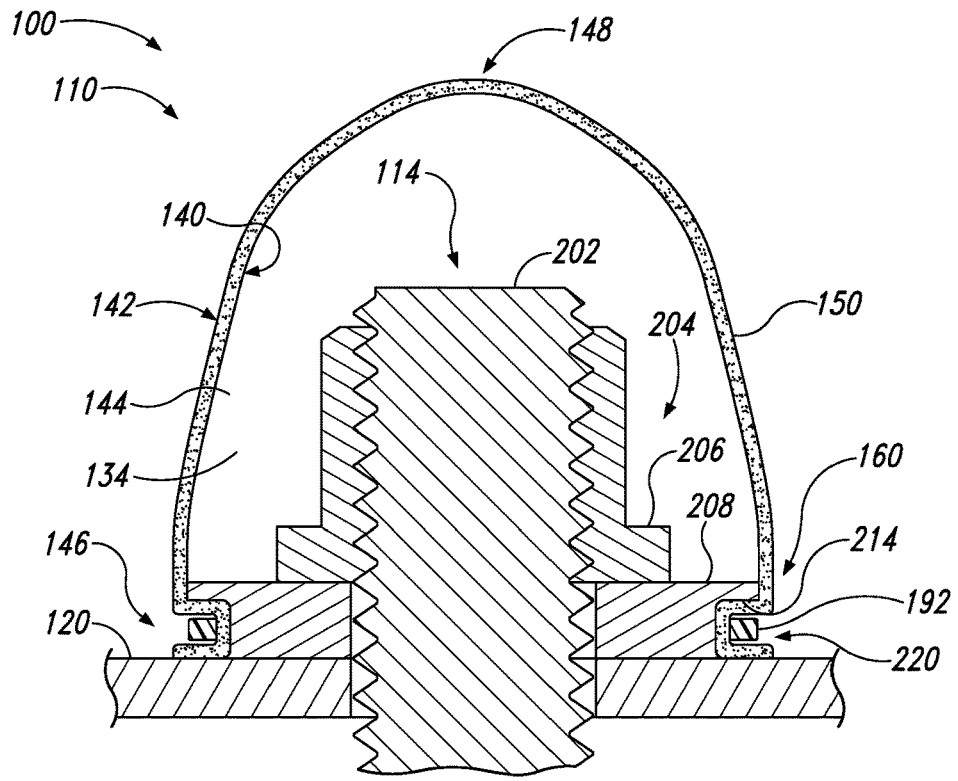
FIG. 14 is a cross sectional view of an example of an ignition-quenching system showing another locking clip coupling.

FIG. 14 illustrates a similar locking clip 192 arrangement as in FIG. 13 but with the fastener attachment feature 210 being a groove 220 that may define a shoulder 214. The groove 220 and/or shoulder 214 may be formed in the washer 208 (as shown), between washers 208 and/or nuts 206, in the nut 206, or the fastener 202.

The locking clip 192 could be used to clamp the ignition-quenching cover 110 to the fastener stack 114 without mechanical protrusions or recesses for the various attachment features. For example, a portion of the fastener stack 114 could present a cylindrical fastener attachment feature 210 and the corresponding cover attachment feature 160 could be a closely-sized cylindrical wall to fit over the cylindrical fastener attachment feature 210. The locking clip 192 could clamp the two surfaces together by applying radial clamping force, e.g., from a strap clamp.

Figure 15:
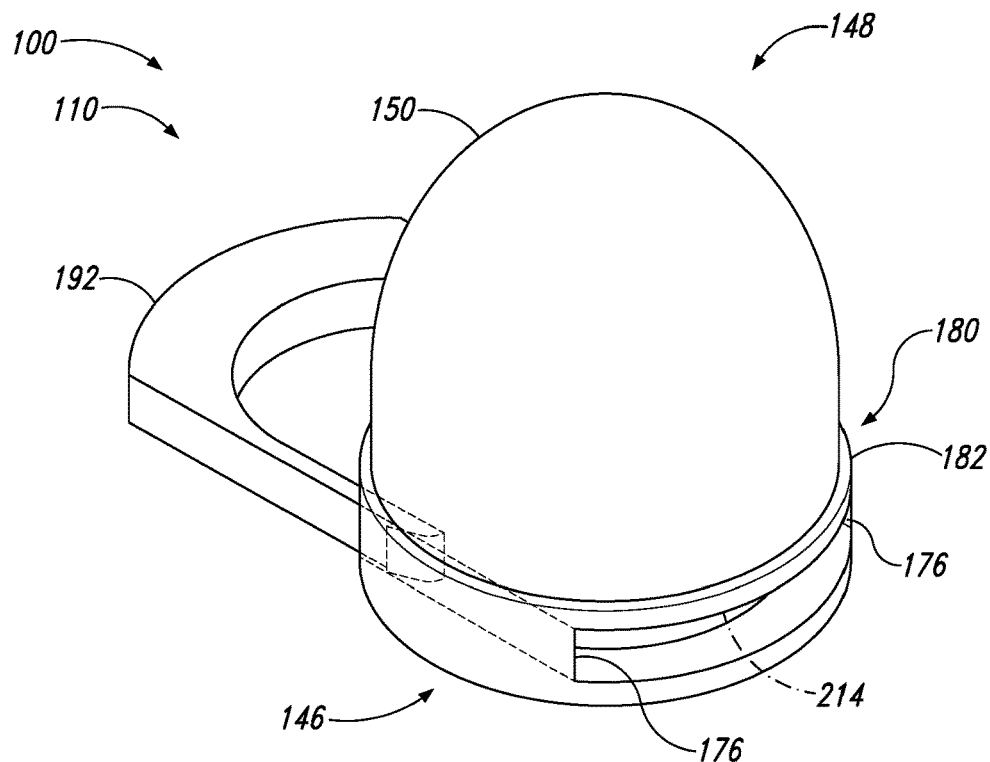
FIG. 15 is a perspective view of an example of an ignition-quenching cover showing yet another locking clip, partially engaged.
Figure 16:
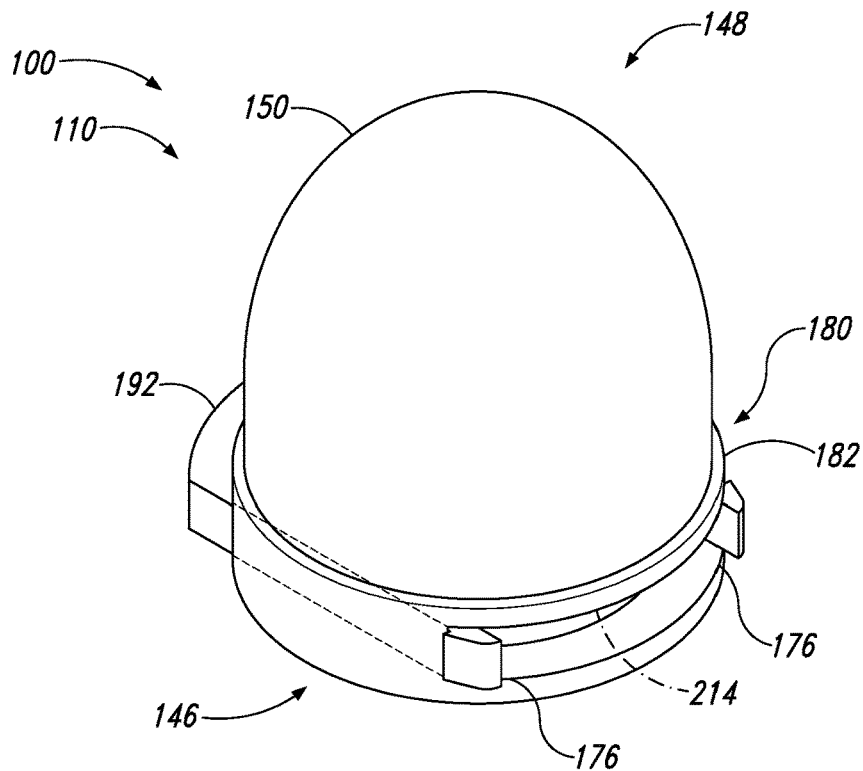
FIG. 16 is a perspective view of the ignition-quenching cover of FIG. 15 showing the locking clip fully engaged.
Figure 17:
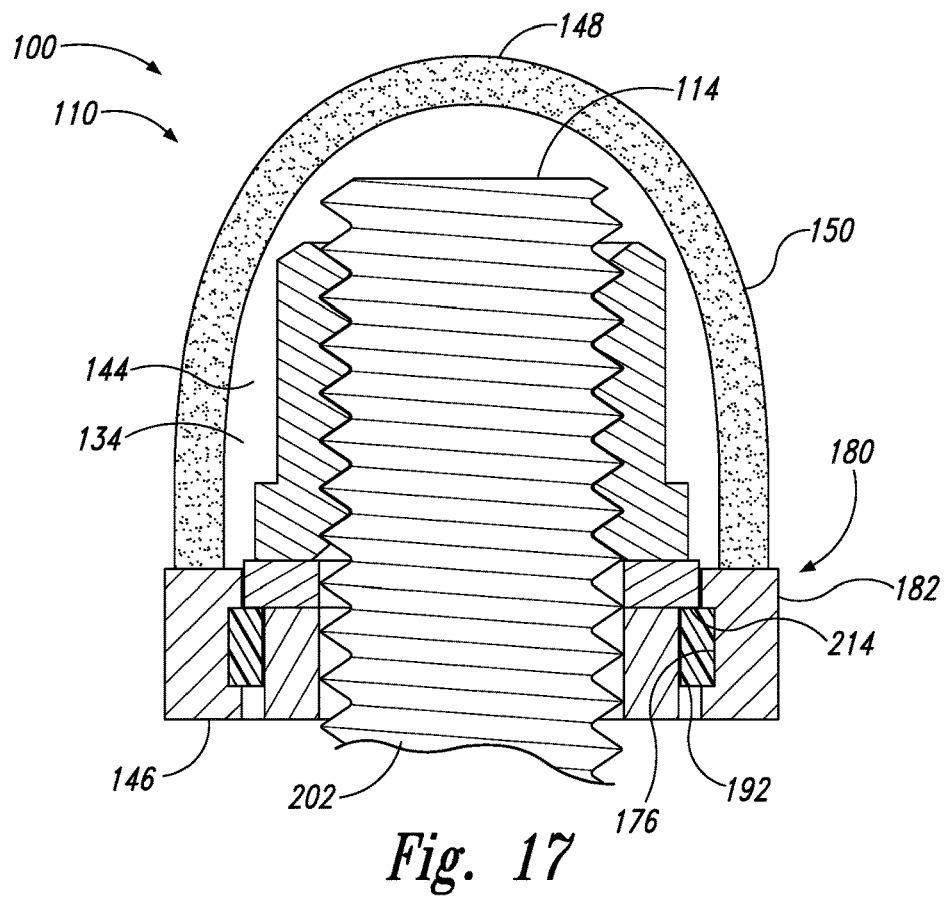
FIG. 17 is a cross sectional view of the ignition-quenching cover of FIG. 15 showing the locking clip engaged.

FIGS. 15-17 illustrate an example of the ignition-quenching system 100 in which the ignition-quenching cover 110 is coupled to the fastener stack 114 by another example of a locking clip 192 configuration. The ignition-quenching cover 110 (e.g., the attachment structure 182) has a channel 176 that is configured to receive the locking clip 192. The locking clip 192 is configured to mechanically interlock the ignition-quenching cover 110 with the fastener stack 114 when the locking clip 192 is inserted into the channel 176. The channel 176 guides the locking clip 192 under the shoulder 214 of the fastener stack 114. As best seen in FIG. 17, the locking clip 192, when installed, is trapped between the shoulder 214 of the fastener stack 114 and the channel 176 of the attachment structure 182. Because of the presence of the locking clip 192, the ignition-quenching cover 110 may not be removed from the fastener stack 114. As best seen in FIGS. 15 and 16, the locking clip 192 may include one or more locking features such as barbs at its tips to retain the locking clip 192 in the channel 176.

Figure 18:
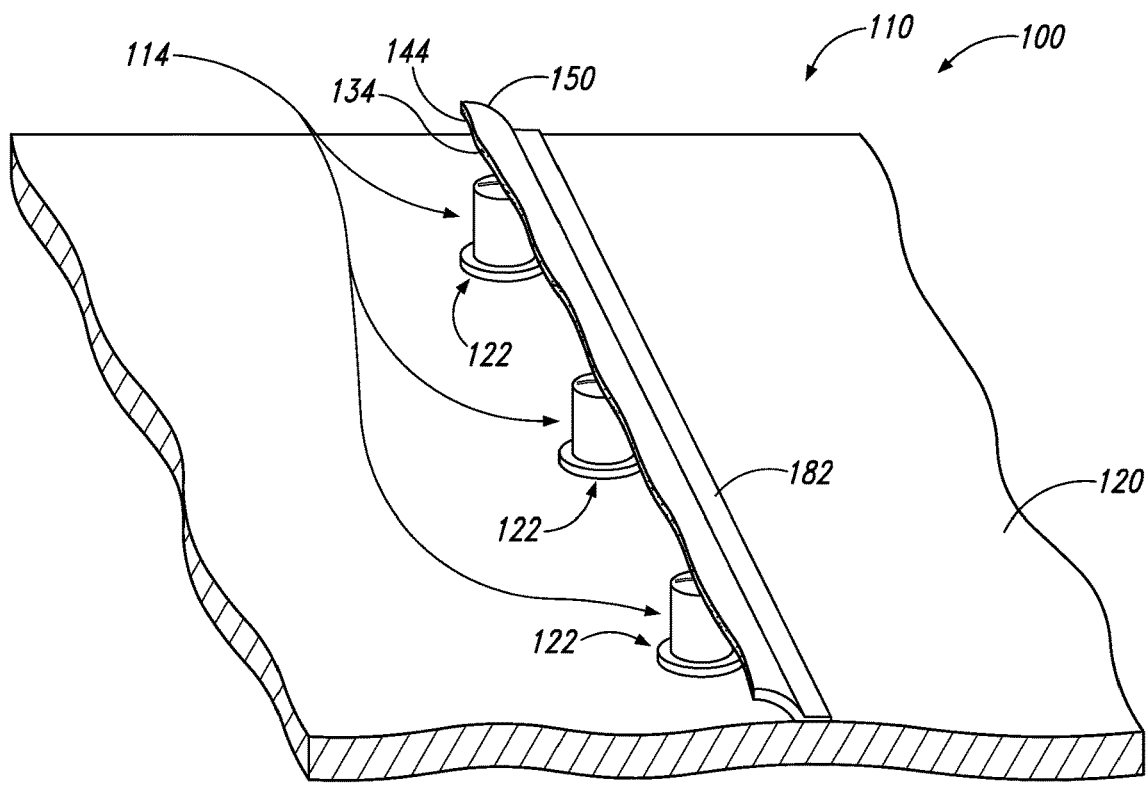
FIG. 18 is a perspective view of an example of an ignition-quenching system with an ignition-quenching cover that covers a plurality of fastener stacks.

As shown in the example of FIG. 18, the ignition-quenching cover 110 may be sized to cover and/or to enclose a plurality of fastener stacks 114. For example, ignition-quenching cover 110 may be in the form of a porous strip or sheet that may cover a series of fastener stacks 114. The fastener stacks 114 may be arranged as a row, a circle, an array, a cluster, etc. The ignition-quenching cover 110 may include one or more cavities 144 that each independently may be configured to enclose and/or receive one or more fasteners 114. The enclosed volume 134 around the plurality of fastener stacks 114 may be at least 0.001 cc per fastener stack, at least 0.01 cc per fastener stack, at least 0.1 cc per fastener stack, at least 1 cc per fastener stack, at most 100 cc per fastener stack, at most 50 cc per fastener stack, at most 20 cc per fastener stack, at most 10 cc per fastener stack, at most 4 cc per fastener stack, and/or at most 2 cc per fastener stack.

Examples of subject matter according to the present disclosure are described in the following enumerated paragraphs.

A1. An ignition-quenching cover configured to quench an ignition event in a combustible environment triggered by an ignition source associated with a fastener stack, the ignition-quenching cover comprising:

a porous body that is gas permeable and that has pores sized to quench ignition in the combustible environment; and a cover attachment feature configured to mate with a fastener attachment feature of the fastener stack;

wherein the ignition-quenching cover is configured to cover a fastener stack, wherein the fastener stack is associated with a potential ignition source that produces an ignition event in a combustible environment.

A2. The ignition-quenching cover of paragraph A1, wherein the porous body at least partially defines a cavity that is configured, sized, and/or shaped to receive the fastener stack.

A2.1. The ignition-quenching cover of paragraph A2, wherein the cavity is configured, sized, and/or shaped to form an enclosed volume around the fastener stack when the ignition-quenching cover is installed at a fastener site of a support structure to which the fastener stack is coupled.

A2.2. The ignition-quenching cover of any of paragraphs A2-A2.1, wherein the cavity is sized to enclose a volume of the combustible environment around the fastener stack that is at least 0.001 cc (cubic centimeters), at least 0.01 cc, at least 0.1 cc, at least 1 cc, at most 100 cc, at most 50 cc, at most 20 cc, at most 10 cc, at most 4 cc, and/or at most 2 cc.

A2.3. The ignition-quenching cover of any of paragraphs A2-A2.2, wherein the cavity is configured, sized, and/or shaped to receive a plurality of fastener stacks that include the fastener stack, and optionally wherein the cavity is sized to enclose a volume of the combustible environment around the plurality of fastener stacks that is at least 0.001 cc per fastener stack, at least 0.01 cc per fastener stack, at least 0.1 cc per fastener stack, at least 1 cc per fastener stack, at most 10 cc per fastener stack, at most 4 cc per fastener stack, and/or at most 2 cc per fastener stack.

A3. The ignition-quenching cover of any of paragraphs A1-A2.3, wherein the ignition source that is at least one of an electrical arc, a hot surface, a hot particle ejection, and an electrostatic discharge.

A4. The ignition-quenching cover of any of paragraphs A1-A3, wherein the ignition source is associated with a buildup of heat and/or electrical charge at the fastener stack.

A5. The ignition-quenching cover of any of paragraphs A1-A4, wherein the ignition-quenching cover is configured to permit a pressure wave associated with the ignition event to travel through the porous body without significant damage to the ignition-quenching cover.

A6. The ignition-quenching cover of any of paragraphs A1-A5, wherein the fastener stack is an electrically conductive structure.

A7. The ignition-quenching cover of any of paragraphs A1-A6, wherein the fastener stack includes at least one of a fastener, a bolt, a stud, or a screw.

A8. The ignition-quenching cover of any of paragraphs A1-A7, wherein the fastener stack includes at least one of a coupling element, a nut, a washer, or a bushing.

A9. The ignition-quenching cover of any of paragraphs A1-A8, wherein the fastener stack is configured to withstand contact with the combustible environment.

A10. The ignition-quenching cover of any of paragraphs A1-A9, wherein the fastener stack is chemically resistant to the combustible environment.

A11. The ignition-quenching cover of any of paragraphs A1-A10, wherein the ignition-quenching cover is configured to be installed in a fuel tank, optionally a wing fuel tank of an aircraft.

A12. The ignition-quenching cover of any of paragraphs A1-A11, wherein the ignition-quenching cover is configured to withstand a temperature of less than 80° C., less than 60° C., less than 40° C., less than 20° C., less than 0° C., greater than −80° C., greater than −60° C., greater than −40° C., greater than −20° C., and/or greater than 0° C.

A13. The ignition-quenching cover of any of paragraphs A1-A12, wherein the ignition-quenching cover is porous to, chemically resistant to, and/or chemically nonreactive with the combustible environment.

A14. The ignition-quenching cover of any of paragraphs A1-A13, wherein the combustible environment includes a fuel and optionally an oxidizer, and optionally wherein the fuel includes at least one of hydrogen, gaseous hydrocarbon, aerosolized hydrocarbon, liquid hydrocarbon, and suspended particulate.

A15. The ignition-quenching cover of any of paragraphs A1-A14, wherein the combustible environment includes at least one of a gas, an aerosol, and a vapor.

A16. The ignition-quenching cover of any of paragraphs A1-A15, wherein the porous body includes, optionally is, one or more porous elements, wherein each porous element independently is a mass of sintered polymer particles, a salt-templated polymer, an inverse-cast polymer, a mesh, a woven fabric, a non-woven fabric, a felt fabric, a reticulated lattice, a truss network, a reticulated foam, or an open-cell foam.

A16.1. The ignition-quenching cover of paragraph A16, wherein at least one of the porous elements is a mass of sintered polymer particles.

A16.2. The ignition-quenching cover of any of paragraphs A16-A16.1, wherein at least one of the porous elements is a salt-templated polymer.

A16.3. The ignition-quenching cover of any of paragraphs A16-A16.2, wherein at least one of the porous elements is an inverse-cast polymer.

A16.4. The ignition-quenching cover of any of paragraphs A16-A16.3, wherein the porous elements are each independently selected from the group consisting of a mesh, a woven fabric, a non-woven fabric, and a felt fabric.

A16.5. The ignition-quenching cover of any of paragraphs A16-A16.4, wherein the porous elements are layered within the porous body.

A17. The ignition-quenching cover of any of paragraphs A1-A16.5, wherein the porous body has a porosity of at least 1%, at least 2%, at least 5%, at least 10%, at least 20%, at least 50%, at least 80%, at least 90%, at least 95%, or at least 98%.

A18. The ignition-quenching cover of any of paragraphs A1-A17, wherein the porous body has an average effective pore diameter that is less than or equal to a quenching distance of the combustible environment.

A19. The ignition-quenching cover of any of paragraphs A1-A18, wherein the porous body has pores with effective diameters that are at least 0.1 mm, at least 0.3 mm, at least 1 mm, at most 10 mm, at most 3 mm, at most 1.5 mm, at most 0.8 mm, and/or at most 0.3 mm.

A20. The ignition-quenching cover of any of paragraphs A1-A19, wherein the porous body has a pore volume that is greater than 50% comprised of pores with an effective diameter between 0.01 mm and 1.5 mm, between 0.1 mm and 1 mm, or between 0.3 mm and 0.8 mm.

A21. The ignition-quenching cover of any of paragraphs A1-A20, wherein the porous body has a thickness of the porous body from an interior surface to an exterior surface and wherein the porous body has no path through the thickness that has a minimum effective diameter greater than 1.5 mm, 1.0 mm, or 0.8 mm.

A22. The ignition-quenching cover of any of paragraphs A1-A21, wherein the porous body has a/the thickness from an/the interior surface to an/the exterior surface that is at least 0.1 mm, at least 0.3 mm, at least 1 mm, at most 10 mm, at most 3 mm, and/or at most 1 mm.

A23. The ignition-quenching cover of any of paragraphs A1-A22, wherein the porous body includes, and/or is composed essentially of, one or more of polypropylene, polystyrene, polyurethane, polyether ether ketone, polytetrafluoroethylene, polyimide, acetal, perfluoroalkoxy alkane, polyamide, polyamide-imide, epoxy, melamine phenolic, polybutylene terephthalate, ethylene vinyl acetate, polysulfide, polysulfone, filled polymer, composite material, carbon fiber-reinforced polymer, fiberglass, ceramic, glass, non-metal, metal, aluminum, steel, or titanium.

A24. The ignition-quenching cover of any of paragraphs A1-A23, wherein the porous body is composed essentially of at least one polymer selected from the group consisting of polypropylene, polystyrene, polyurethane, polyether ether ketone, polytetrafluoroethylene, polyimide, acetal, perfluoroalkoxy alkane, polyamide, polyamide-imide, epoxy, melamine phenolic, polybutylene terephthalate, ethylene vinyl acetate, polysulfide, or polysulfone.

A25. The ignition-quenching cover of any of paragraphs A1-A24, wherein the porous body is coated with a paracyclophane conformal coating.

A26. The ignition-quenching cover of any of paragraphs A1-A25, wherein the porous body is electrically insulating.

A27. The ignition-quenching cover of any of paragraphs A1-A26, wherein the porous body has a volumetric specific heat capacity that is at least 10 times, at least 100 times, or at least 1,000 times a volumetric specific heat capacity of the combustible environment.

A28. The ignition-quenching cover of any of paragraphs A1-A27, wherein the porous body has a total heat capacity that is at least 3 times, at least 10 times, or at least 30 times a total heat capacity of the combustible environment within a volume defined by the porous body.

A29. The ignition-quenching cover of any of paragraphs A1-A28, wherein the porous body has a thermal conductivity that is at least 5 times, at least 10 times, at least 100 times, or at least 1,000 times a thermal conductivity of the combustible environment.

A30. The ignition-quenching cover of any of paragraphs A1-A29, wherein the porous body has no pores with a straight line trajectory from an interior surface of the ignition-quenching cover to an exterior surface of the ignition-quenching cover.

A31. The ignition-quenching cover of any of paragraphs A1-A30, further comprising a frame.

A31.1. The ignition-quenching cover of paragraph A31, wherein the frame is non-porous.

A31.2. The ignition-quenching cover of any of paragraphs A31-A31.1, wherein the frame includes an attachment structure that includes the cover attachment feature.

A31.2.1. The ignition-quenching cover of paragraph A31.2, wherein the attachment structure is bonded to the porous body, optionally by one or more of sintering, welding, or adhesive bonding.

A31.2.2. The ignition-quenching cover of any of paragraphs A31.2-A31.2.1, wherein the cover attachment feature of the attachment structure includes a size-changing material that is at least one of shrink-fit material or grow-fit material, wherein the attachment structure is configured to fit over the fastener stack before the size-changing material is activated, and wherein the attachment structure is configured to mechanically interlock with the fastener attachment feature when the size-changing material is activated.

A31.3. The ignition-quenching cover of any of paragraphs A31-A31.2.2, wherein the frame includes a cap structure configured to span a tip of the ignition-quenching cover that is distal from a base of the ignition-quenching cover that is configured to receive the fastener stack, and optionally wherein the cap structure is configured to protect the porous body from damage during installation of the ignition-quenching cover over the fastener stack.

A31.4. The ignition-quenching cover of any of paragraphs A31-A31.3, wherein the frame is more rigid, more durable, more abrasion resistant, and/or more impact-resistant than the porous body.

A31.5. The ignition-quenching cover of any of paragraphs A31-A31.4, wherein the frame is configured to support the porous body, and optionally is an exoskeleton, an endoskeleton, or an internal skeleton for the porous body.

A31.6. The ignition-quenching cover of any of paragraphs A31-A31.5, wherein the frame forms less than 50%, less than 20%, or less than 10% of an/the exterior surface of the ignition-quenching cover.

A31.7. The ignition-quenching cover of any of paragraphs A31-A31.6, wherein the frame includes a flexible region at a/the base of the ignition-quenching cover that is configured to at least partially conform, optionally completely conform, to the support structure around the fastener stack.

A32. The ignition-quenching cover of any of paragraphs A1-A31.7, wherein the ignition-quenching cover includes at least two cover members that selectively mate together to form the ignition-quenching cover.

A32.1. The ignition-quenching cover of paragraph A32, wherein the cover members are configured to separate to receive the fastener stack and to mate with the fastener stack received within the ignition-quenching cover.

A32.2. The ignition-quenching cover of any of paragraphs A32-A32.1, wherein each of the cover members includes a mating structure that is configured to couple to complementary mating structures, optionally in a snap-fit arrangement, and optionally wherein the mating structures are a portion of a/the frame of the ignition-quenching cover.

A33. The ignition-quenching cover of any of paragraphs A1-A32.2, wherein the cover attachment feature and the fastener attachment feature are configured to thread together, snap together, and/or mechanically interlock.

A34. The ignition-quenching cover of any of paragraphs A1-A33, wherein the fastener attachment feature includes a radially protruding tab and the cover attachment feature includes an entry slot to receive the tab, a locking ramp to engage the tab while twisting the ignition-quenching cover, and a retention slot to positively hold the tab, and wherein the ignition-quenching cover is coupled to the fastener stack with the tab engaged in the retention slot.

A35. The ignition-quenching cover of any of paragraphs A1-A34, wherein the cover attachment feature includes cover attachment threads and the fastener attachment feature includes fastener attachment threads, and wherein the cover attachment threads are configured to engage the fastener attachment threads to couple the ignition-quenching cover to the fastener stack.

A36. The ignition-quenching cover of any of paragraphs A1-A35, wherein the cover attachment feature includes a rim, wherein the fastener attachment feature includes a shoulder, and wherein the rim and the shoulder are configured to engage together to couple the ignition-quenching cover to the fastener stack.

A36.1. The ignition-quenching cover of paragraph A36, wherein the rim is an annular rim protruding from an interior of the ignition-quenching cover.

A36.2. The ignition-quenching cover of any of paragraphs A36-A36.1, wherein the shoulder is an annular shoulder.

A37. The ignition-quenching cover of any of paragraphs A1-A36.2, wherein the cover attachment feature includes a barb.

A37.1. The ignition-quenching cover of paragraph A37, wherein the cover attachment feature includes a series of circumferentially-spaced barbs.

A37.2. The ignition-quenching cover of any of paragraphs A37-A37.1, wherein the barb is coupled to an interior of the ignition-quenching cover via a flexible arm.

A37.3. The ignition-quenching cover of any of paragraphs A37-A37.2, wherein the fastener attachment feature includes a shoulder and wherein the shoulder and the barb are configured to engage together to couple the ignition-quenching cover to the fastener stack.

A37.4. The ignition-quenching cover of any of paragraphs A37-A37.2, wherein the fastener attachment feature includes fastener attachment threads and wherein the fastener attachment threads and the barb are configured to engage together to couple the ignition-quenching cover to the fastener stack.

A38. The ignition-quenching cover of any of paragraphs A1-A37.4, further comprising a locking clip configured to mechanically interlock the porous body and/or a/the frame of the ignition-quenching cover with the fastener stack.

A38.1. The ignition-quenching cover of paragraph A38, wherein the cover attachment feature includes a flexible portion at a/the base of the ignition-quenching cover, wherein the locking clip is configured to tighten around the flexible portion to compress the flexible portion against the fastener stack.

A38.1.1. The ignition-quenching cover of paragraph A38.1, wherein the locking clip is at least one of a strap, a strap clamp, a twist tie, or a cylindrical band.

A38.1.2. The ignition-quenching cover of any of paragraphs A38.1-A38.1.1, wherein the locking clip is a band of shrink-wrap material.

A38.1.3. The ignition-quenching cover of any of paragraphs A38.1-A38.1.2, wherein the flexible portion is a portion of the porous body.

A38.2. The ignition-quenching cover of paragraph A38, wherein the cover attachment feature includes a channel to accept the locking clip, wherein the fastener attachment feature includes a shoulder, and wherein the locking clip fits within the channel to contact the shoulder.

A38.3. The ignition-quenching cover of any of paragraphs A38-A38.2, wherein the fastener attachment feature includes at least one of a shoulder or a groove that is configured to receive the locking clip.

A39. The ignition-quenching cover of any of paragraphs A1-A38.3, wherein the porous body is flexible and includes a seam at a/the tip of the ignition-quenching cover, and optionally wherein the porous body is formed by sealing an open-topped porous body with the seam.

A40. The ignition-quenching cover of any of paragraphs A1-A39, wherein the porous body includes a flexible region at a/the base of the ignition-quenching cover that is configured to at least partially conform, optionally completely conform, to the support structure around the fastener stack.

B1. An ignition-quenching system for preventing bulk combustion in a combustible environment by an ignition source associated with a fastener stack, the ignition-quenching system comprising:
a porous ignition-quenching cover that includes a porous body and a cover attachment feature, wherein the porous body is gas permeable and has pores sized to quench ignition in the combustible environment; and
a fastener stack that includes a fastener attachment feature and that extends from a support structure;
wherein the porous ignition-quenching cover encloses the fastener stack into an enclosed volume around the fastener stack, wherein the porous ignition-quenching cover and the fastener stack are coupled together by engagement of the cover attachment feature and the fastener attachment feature.

B2. The ignition-quenching system of paragraph B1, wherein the porous ignition-quenching cover is the ignition-quenching cover of any of paragraphs A1-A40.

B3. The ignition-quenching system of any of paragraphs B1-B2, wherein the fastener stack is the fastener stack of any of paragraphs A1-A40.

B4. The ignition-quenching system of any of paragraphs B1-B3, wherein the support structure is the support structure of any of paragraphs A1-A40.

B5. The ignition-quenching system of any of paragraphs B1-B4, wherein the combustible environment is the combustible environment of any of paragraphs A1-A40.

B6. The ignition-quenching system of any of paragraphs B1-B5, wherein the fastener stack extends from the support structure into the combustible environment.

B7. The ignition-quenching system of any of paragraphs B1-B6, wherein the fastener stack is coupled to the support structure.

B8. The ignition-quenching system of any of paragraphs B1-B7, further comprising the support structure, optionally wherein the support structure is in contact with the combustible environment.

B9. The ignition-quenching system of any of paragraphs B1-B8, further comprising the combustible environment.

B10. The ignition-quenching system of any of paragraphs B1-B9, wherein the combustible environment is in the enclosed volume, an interior volume of the porous ignition-quenching cover, and an exterior volume that is exterior to the porous ignition-quenching cover.

B11. The ignition-quenching system of any of paragraphs B1-1310, wherein the porous ignition-quenching cover is affixed to the support structure, optionally wherein the porous ignition-quenching cover is affixed by an adhesive, further optionally a polysulfide adhesive.

B12. The ignition-quenching system of any of paragraphs B1-B11, wherein the porous ignition-quenching cover is spaced apart from the support structure by a spacing.

B12.1. The ignition-quenching system of paragraph B12, wherein the spacing is less than a quenching distance of the combustible environment.

B12.2. The ignition-quenching system of any of paragraphs B12-B12.1, wherein the spacing is at least partially filled with an adhesive, optionally a polysulfide adhesive.

B12.3. The ignition-quenching system of any of paragraphs B12-B12.2, wherein the spacing is at most 1 mm, at most 0.8 mm, or at most 0.5 mm.

B13. The ignition-quenching system of any of paragraphs B1-B12.3, wherein the fastener attachment feature includes a radially protruding tab and the cover attachment feature includes an entry slot to receive the tab, a locking ramp to engage the tab while twisting the porous ignition-quenching cover, and a retention slot to positively hold the tab, and wherein the porous ignition-quenching cover is coupled to the fastener stack with the tab engaged in the retention slot.

B13.1. The ignition-quenching system of paragraph B13, wherein the radially protruding tab includes an inclined radial section at a tip of the tab.

B13.2. The ignition-quenching system of any of paragraphs B13-B13.1, wherein the fastener stack includes a washer that includes the tab.

B13.3. The ignition-quenching system of any of paragraphs B13-B13.1, wherein the fastener stack includes a nut that includes the tab.

B14. The ignition-quenching system of any of paragraphs B1-B13.3, wherein the fastener attachment feature includes fastener threads and the cover attachment feature includes attachment threads, and wherein the attachment threads of the porous ignition-quenching cover are engaged with the fastener threads of the fastener stack to couple the porous ignition-quenching cover to the fastener stack.

B15. The ignition-quenching system of any of paragraphs B1-B14, wherein the cover attachment feature includes a rim, wherein the fastener attachment feature includes a shoulder, and wherein the rim and the shoulder are engaged to couple the porous ignition-quenching cover to the fastener stack.

B15.1. The ignition-quenching system of paragraph B15, wherein the rim is an annular rim protruding from an interior of the ignition-quenching cover.

B15.2. The ignition-quenching system of any of paragraphs B15-B15.1, wherein the shoulder is an annular shoulder.

B15.3. The ignition-quenching system of any of paragraphs B15-B15.2, wherein the fastener stack includes at least a narrow washer and a wide washer that are stacked in contact with each other and with the narrow washer closer to the support structure to form the shoulder at an interface between the narrow washer and the wide washer.

B15.4. The ignition-quenching system of any of paragraphs B15-B15.3, wherein the fastener stack includes a washer that defines the shoulder.

B15.5. The ignition-quenching system of any of paragraphs B15-B15.4, wherein the fastener stack includes a nut that defines the shoulder.

B16. The ignition-quenching system of any of paragraphs B1-B15.5, wherein the cover attachment feature includes a barb.

B16.1. The ignition-quenching system of paragraph B16, wherein the cover attachment feature includes a series of circumferentially-spaced barbs.

B16.2. The ignition-quenching system of any of paragraphs B16-B16.1, wherein the barb is coupled to an interior of the ignition-quenching cover via a flexible arm.

B16.3. The ignition-quenching system of any of paragraphs B16-B16.2, wherein the fastener attachment feature includes a shoulder and wherein the shoulder and the barb are configured to engage together to couple the ignition-quenching cover to the fastener stack.

B16.4. The ignition-quenching system of any of paragraphs B16-B16.2, wherein the fastener attachment feature includes fastener attachment threads and wherein the fastener attachment threads and the barb are engaged to couple the porous ignition-quenching cover to the fastener stack.

B17. The ignition-quenching system of any of paragraphs B1-B16.4, further comprising a locking clip that mechanically interlocks the porous ignition-quenching cover with the fastener stack.

B17.1. The ignition-quenching system of paragraph B17, wherein the cover attachment feature includes a flexible portion at a/the base of the ignition-quenching cover, wherein the locking clip is tightened around the flexible portion to compress the flexible portion against the fastener stack.

B17.1.1. The ignition-quenching system of paragraph B17.1, wherein the locking clip is at least one of a strap, a strap clamp, a twist tie, or a cylindrical band.

B17.1.2. The ignition-quenching system of any of paragraphs B17.1-B17.1.1, wherein the locking clip is a band of shrink-wrap material.

B17.1.3. The ignition-quenching system of any of paragraphs B17.1-B17.1.2, wherein the flexible portion is a portion of the porous body.

B17.2. The ignition-quenching system of any of paragraphs B17-B17.1.3, wherein the fastener attachment feature includes at least one of a shoulder or a groove that is configured to receive the locking clip.

B17.2.1. The ignition-quenching system of paragraph B17.2, wherein the shoulder is defined by one or more washers of the fastener stack.

B17.2.2. The ignition-quenching system of any of paragraphs B17.2-B17.2.1, wherein the groove is defined by one or more washers of the fastener stack.

B17.2.3. The ignition-quenching system of any of paragraphs B17.2-B17.2.2, wherein the shoulder is defined by a/the nut of the fastener stack.

B17.2.4. The ignition-quenching system of any of paragraphs B17.2-B17.2.3, wherein the groove is defined by a/the nut of the fastener stack.

B17.3. The ignition-quenching system of paragraph B17, wherein the cover attachment feature includes a channel to accept the locking clip, wherein the fastener attachment feature includes a shoulder, and wherein the locking clip is within the channel in contact with the shoulder.

B17.3.1. The ignition-quenching system of paragraph B17.3, wherein the shoulder is defined by one or more washers of the fastener stack.

B17.3.2. The ignition-quenching system of paragraph B17.3, wherein the shoulder is defined by a/the nut of the fastener stack.

B18. The ignition-quenching system of any of paragraphs B1-B17.3.2, wherein the porous ignition-quenching cover is integrally formed with at least a portion of the fastener stack.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the singular forms "a," "an," and "the" may be intended to include the plural forms as well, unless the context clearly indicates otherwise.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An ignition-quenching cover configured to quench an ignition event in a combustible environment triggered by an ignition source associated with a fastener stack, the ignition-quenching cover comprising:
   a porous body that is gas permeable and that has pores sized to quench ignition in the combustible environment;
   a cover attachment feature configured to mate with a fastener attachment feature of the fastener stack; and
   a non-porous frame that is bonded to the porous body and that defines the cover attachment feature;
   wherein the ignition-quenching cover is configured to cover the fastener stack, wherein the fastener stack is associated with a potential ignition source that may produce the ignition event in the combustible environment.

2. The ignition-quenching cover of claim 1, wherein the porous body includes one or more porous elements, wherein each of the one or more porous elements independently is a mass of sintered polymer particles, a salt-templated polymer, an inverse-cast polymer, a mesh, a woven fabric, a non-woven fabric, or a felt fabric.

3. The ignition-quenching cover of claim 2, wherein at least one of the porous elements is a mass of sintered polymer particles.

4. The ignition-quenching cover of claim 2, wherein the porous elements are each independently selected from the group consisting of a mesh, a woven fabric, a non-woven fabric, and a felt fabric.

5. The ignition-quenching cover of claim 1, wherein the porous body is composed essentially of polysulfide.

6. The ignition-quenching cover of claim 1, wherein the porous body has a pore volume that is greater than 50% comprised of pores with an effective diameter between 0.01 mm and 1.5 mm.

7. The ignition-quenching cover of claim 1, wherein the porous body is flexible and includes a seam at a tip of the ignition-quenching cover, and wherein the porous body is formed by sealing an open-topped porous body with the seam.

8. The ignition-quenching cover of claim 1, wherein the porous body includes a flexible region at a base of the ignition-quenching cover that is configured to at least partially conform to a support structure around the fastener stack.

9. The ignition-quenching cover of claim 1, further comprising a locking clip configured to mechanically interlock the porous body of the ignition-quenching cover with the fastener stack, wherein the cover attachment feature includes a flexible portion at a base of the ignition-quenching cover, wherein the locking clip is configured to tighten around the flexible portion to compress the flexible portion against the fastener stack.

10. The ignition-quenching cover of claim 1, further comprising an attachment structure that includes the cover attachment feature, wherein the cover attachment feature of the attachment structure includes a size-changing material that is at least one of shrink-fit material or grow-fit material, wherein the attachment structure is configured to fit over the fastener stack before the size-changing material is activated, and wherein the attachment structure is configured to mechanically interlock with the fastener attachment feature when the size-changing material is activated.

11. The ignition-quenching cover of claim 1, wherein the ignition-quenching cover is configured to be affixed to a support structure around the fastener stack by an adhesive.

12. The ignition-quenching cover of claim 1, wherein the fastener attachment feature includes a radially protruding tab and the cover attachment feature includes an entry slot to receive the radially protruding tab, a locking ramp to engage the tab while twisting the ignition-quenching cover, and a retention slot to positively hold the radially protruding tab, and wherein the ignition-quenching cover is coupled to the fastener stack with the radially protruding tab engaged in the retention slot.

13. The ignition-quenching cover of claim 1, wherein the ignition-quenching cover includes at least two cover members that selectively mate together to form the ignition-quenching cover, wherein the cover members are configured to mate with the fastener stack received between the cover members, and wherein each of the cover members includes a mating structure that is a portion of the non-porous frame and that is configured to couple to complementary mating structures.

14. The ignition-quenching cover of claim 1, wherein the non-porous frame includes a cap structure configured to span a tip of the ignition-quenching cover that is distal from a base of the ignition-quenching cover that is configured to receive the fastener stack.

15. The ignition-quenching cover of claim 1, wherein the non-porous frame includes a flexible region at a base of the ignition-quenching cover that is configured to at least partially conform to a support structure around the fastener stack.

16. The ignition-quenching cover of claim 1, wherein the non-porous frame is configured to support the porous body, and is an exoskeleton, an endoskeleton, or an internal skeleton for the porous body.

17. The ignition-quenching cover of claim 1, wherein the porous body at least partially defines a cavity that is configured to receive a plurality of fastener stacks.

18. The ignition-quenching cover of claim 1, further comprising a locking clip configured to mechanically interlock the non-porous frame of the ignition-quenching cover with the fastener stack, wherein the cover attachment feature includes a channel to accept the locking clip, wherein the fastener attachment feature includes a shoulder, and wherein the locking clip fits within the channel to contact the shoulder.

19. The ignition-quenching cover of claim 1 in combination with the fastener stack and a support structure from which the fastener stack extends,
wherein the fastener stack includes the fastener attachment feature; and
wherein the ignition-quenching cover encloses the fastener stack into an enclosed volume around the fastener stack, wherein the ignition-quenching cover and the fastener stack are coupled together by engagement of the cover attachment feature and the fastener attachment feature.

20. The combination of claim 19, wherein the fastener attachment feature includes a radially protruding tab and the cover attachment feature includes an entry slot to receive the radially protruding tab, a locking ramp to engage the radially protruding tab while twisting the ignition-quenching cover, and a retention slot to positively hold the radially protruding tab, and wherein the ignition-quenching cover is coupled to the fastener stack with the radially protruding tab engaged in the retention slot.

* * * * *